(12) United States Patent
Lee et al.

(10) Patent No.: US 11,621,871 B2
(45) Date of Patent: Apr. 4, 2023

(54) RECEIVER PERFORMING BACKGROUND TRAINING, MEMORY DEVICE INCLUDING THE SAME AND METHOD OF RECEIVING DATA USING THE SAME

(71) Applicant: Samsung Electronics Co., Ltd., Suwon-si (KR)

(72) Inventors: Sucheol Lee, Suwon-si (KR); Changkyu Seol, Osan-si (KR); Byungsuk Woo, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/393,811

(22) Filed: Aug. 4, 2021

(65) Prior Publication Data
US 2022/0173942 A1    Jun. 2, 2022

(30) Foreign Application Priority Data
Nov. 27, 2020 (KR) ........................ 10-2020-0161860

(51) Int. Cl.
*H04L 25/03* (2006.01)
*H04L 27/00* (2006.01)

(52) U.S. Cl.
CPC ................. *H04L 25/03006* (2013.01); *H04L 2025/0377* (2013.01); *H04L 2025/03815* (2013.01); *H04L 2027/0042* (2013.01)

(58) Field of Classification Search
CPC ....... H04L 25/03006; H04L 2025/0377; H04L 2025/03815; H04L 2027/0042
See application file for complete search history.

(56) References Cited

U.S. PATENT DOCUMENTS

| 6,891,910 B2 | 5/2005 | Hwang et al. |
| 7,408,982 B2 | 8/2008 | Jeon et al. |
| 7,486,728 B2 | 2/2009 | Park |
| 7,679,133 B2 | 3/2010 | Son et al. |
| 8,553,466 B2 | 10/2013 | Han et al. |
| 8,559,235 B2 | 10/2013 | Yoon et al. |

(Continued)

FOREIGN PATENT DOCUMENTS

KR    2007-0095717 A    10/2007

*Primary Examiner* — Dac V Ha
(74) *Attorney, Agent, or Firm* — Harness, Dickey & Pierce, P.L.C.

(57) ABSTRACT

A receiver included in a memory device includes a flag generator circuit, an equalizer circuit and an equalization controller circuit. The flag generator circuit is configured to, during a normal operation mode, generates a flag signal without an external command. The equalizer circuit is configured to, during the normal operation mode, receive an input data signal through a channel, generate an equalized signal by equalizing the input data signal based on an equalization coefficient, and generate a data sample signal including a plurality of data bits based on the equalized signal. The equalization controller circuit is configured to, during the normal operation mode, determine an amount of change in the equalization coefficient based on the flag signal, the equalized signal and the data sample signal, and perform a training operation in which the equalization coefficient is updated in real time based on the amount of change in the equalization coefficient.

22 Claims, 17 Drawing Sheets

(56) References Cited

U.S. PATENT DOCUMENTS

| | | |
|---|---|---|
| 8,654,587 B2 | 2/2014 | Yoon et al. |
| 9,960,936 B2 | 5/2018 | Shibata |
| 2007/0053419 A1 | 3/2007 | Park et al. |
| 2011/0233648 A1 | 9/2011 | Seol et al. |
| 2013/0332156 A1* | 12/2013 | Tackin ................ H04M 1/6041 704/226 |
| 2014/0269868 A1* | 9/2014 | Werner .................... H04B 3/54 375/224 |
| 2016/0196819 A1* | 7/2016 | Wurtz .............. G10K 11/17854 381/94.3 |
| 2018/0018294 A1* | 1/2018 | Park .................... G06F 13/4068 |
| 2019/0179553 A1 | 6/2019 | Kim et al. |
| 2020/0073562 A1* | 3/2020 | Kim ...................... G06F 3/0673 |
| 2020/0195196 A1* | 6/2020 | Petrovic ................. G01S 19/21 |
| 2022/0068359 A1* | 3/2022 | Shin .................... G11C 11/4074 |

\* cited by examiner

RECEIVER PERFORMING BACKGROUND TRAINING, MEMORY DEVICE INCLUDING THE SAME AND METHOD OF RECEIVING DATA USING THE SAME

CROSS-REFERENCE TO RELATED APPLICATION

This application claims priority under 35 USC § 119 to Korean Patent Application No. 10-2020-0161860 filed on Nov. 27, 2020 in the Korean Intellectual Property Office (KIPO), the contents of which are herein incorporated by reference in their entirety.

BACKGROUND

1. Technical Field

Example embodiments relate generally to semiconductor integrated circuits, and more particularly to receivers performing background training, memory systems including the receivers, and methods of receiving data using the receivers.

2. Description of the Related Art

Semiconductor memory devices can generally be divided into two categories depending upon whether or not they retain stored data when disconnected from a power supply. These categories include volatile memory devices, which lose stored data when disconnected from power, and non-volatile memory devices, which retain stored data when disconnected from power. Volatile memory devices may perform read and write operations at a high speed, while contents stored therein may be lost at power-off. Nonvolatile memory devices may retain contents stored therein even at power-off, which means they may be used to store data that must be retained regardless of whether they are powered.

Recently, as the performance of the semiconductor memory device is improved, the amount of data exchanged between a memory controller and the semiconductor memory device increases, and thus a high communication speed (or interface speed) is required between the memory controller and the semiconductor memory device. The bandwidth of the communication channel may be restricted and the signals on the communication channel may be distorted due to various causes such as skin effect, dielectric loss, etc. Accordingly, quality of the signals transferred with high speed may be degraded.

SUMMARY

At least one example embodiment of the inventive concepts provides a receiver capable of efficiently improving or enhancing signal characteristics based on background training.

At least one example embodiment of the inventive concepts provides a memory device including the receiver.

At least one example embodiment of the inventive concepts provides a method of receiving data using the receiver.

According to at least some example embodiments of the inventive concepts, a receiver included in a memory device includes a flag generator circuit, an equalizer circuit and an equalization controller circuit. During a normal operation mode, the flag generator circuit generates a flag signal without an external command. During the normal operation mode, the equalizer circuit receives an input data signal through a channel, generates an equalized signal by equalizing the input data signal based on an equalization coefficient, and generates a data sample signal including a plurality of data bits based on the equalized signal. During the normal operation mode, the equalization controller circuit determines an amount of change in the equalization coefficient based on the flag signal, the equalized signal and the data sample signal, and performs a training operation in which the equalization coefficient is updated in real time based on the amount of change in the equalization coefficient.

According to at least some example embodiments of the inventive concepts, a memory device includes a receiver circuit and a memory cell array. The receiver circuit receives an input data signal. The memory cell array performs a data write operation based on the input data signal. The receiver circuit included in a memory device includes a flag generator circuit, an equalizer circuit and an equalization controller circuit. During a normal operation mode, the flag generator circuit generates a flag signal without an external command. During the normal operation mode, the equalizer circuit receives the input data signal through a channel, generates an equalized signal by equalizing the input data signal based on an equalization coefficient, and generates a data sample signal including a plurality of data bits based on the equalized signal. During the normal operation mode, the equalization controller circuit determines an amount of change in the equalization coefficient based on the flag signal, the equalized signal and the data sample signal, and performs a training operation in which the equalization coefficient is updated in real time based on the amount of change in the equalization coefficient.

According to at least some example embodiments of the inventive concepts, a receiver included in a memory device includes a flag generator circuit, an equalizer circuit, a reference voltage generator circuit, a processing circuit, an equalization coefficient controller circuit and a memory register. During a normal operation mode, the flag generator circuit generates a flag signal by detecting a change in an operating environment or by detecting a change in a state signal associated with an operation of the memory device without an external command. During the normal operation mode, the equalizer circuit receives an input data signal through a channel, generates an equalized signal by equalizing the input data signal based on an equalization coefficient, and generates a data sample signal including a plurality of data bits based on the equalized signal. During the normal operation mode, the reference voltage generator circuit generates a reference voltage based on the flag signal. During the normal operation mode, a processing circuit checks whether the equalization coefficient is optimized or, alternatively, set to a desired level based on the flag signal, the reference voltage, the equalized signal and the data sample signal, and determines and outputs an amount of change in the equalization coefficient for optimizing the equalization coefficient or, alternatively, setting the equalization coefficient to a desired level when the equalization coefficient is not optimized or, alternatively, set to a desired level. During the normal operation mode, the equalization coefficient controller circuit updates the equalization coefficient in real time based on the amount of change in the equalization coefficient. The memory register stores the equalization coefficient. The input data signal corresponds to normal write data that is provided from a memory controller located outside the memory device during the normal operation mode. An operation of updating the equalization coefficient in real time corresponds to a background self-training operation that is performed based on the normal write data during the normal operation mode, is internally performed without a control of the memory controller, and is hidden with respect to the memory controller.

According to at least some example embodiments of the inventive concepts, in a method of receiving data, during a normal operation mode, an input data signal is received through a channel. During the normal operation mode, an equalized signal is generated by equalizing the input data signal based on an equalization coefficient and a data sample signal including a plurality of data bits is generated based on the equalized signal. During the normal operation mode, a flag signal is generated without an external command. During the normal operation mode, an amount of change in the equalization coefficient is determined based on the flag signal, the equalized signal and the data sample signal. During the normal operation mode, the equalization coefficient is updated in real time based on the amount of change in the equalization coefficient.

In the receiver, the memory device and the method of receiving data according to at least some example embodiments of the inventive concepts, a separate training mode may not be entered and/or a separate training sequence may not be performed when it is required to optimize the equalization coefficient used in the receiver or, alternatively, set the equalization parameter used in the receiver to a desired value. The receiver may perform the background self-training operation, which is performed based on the normal write data during the normal operation mode, is internally performed by itself without the control of the memory controller, and is hidden with respect to the memory controller, to update the equalization coefficient in real time. Accordingly, the optimized or, alternatively, desired equalization coefficient may be efficiently determined or set while reducing or, alternatively, minimizing the degradation of system performance.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION OF THE EMBODIMENTS

Figure 1:
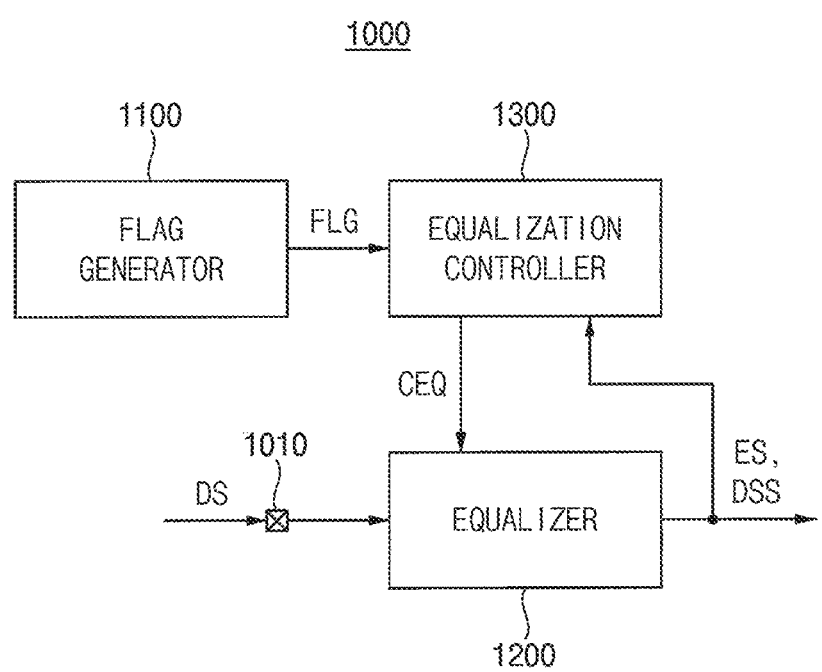
FIG. 1 is a block diagram illustrating a receiver according to at least some example embodiments of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is a block diagram illustrating a receiver according to at least some example embodiments of the inventive concepts.

Referring to FIG. 1, a receiver 1000 includes a flag generator 1100, an equalizer 1200 and an equalization controller 1300. The receiver 1000 may further include a data input pad (or pin) 1010.

The receiver 1000 is implemented to receive an input data signal DS and to generate a plurality of data bits based on the input data signal DS. For example, the input data signal DS may be generated based on a non-return-to-zero (NRZ) scheme in which a signal has two voltage levels that are different from each other. For example, the input data signal DS may have one of the two voltage levels during one unit interval (UI), and may be referred to as a two-level signal. The receiver 1000 may be included in various communication systems and/or signal transmission systems, and may be included in, for example, a memory device and/or a memory system. Configurations of the memory device and/or the memory system including the receiver 1000 will be described in detail later. The flag generator 1100, equalizer 1200 and equalization controller 1300 of the receiver 1000 will now be discussed in greater detail below.

Each of the flag generator 1100, equalizer 1200 and equalization controller 1300 may be embodied by processing circuitry such as hardware including logic circuits; a hardware/software combination executing software; or a combination thereof. For example, the processing circuitry more specifically may include, but is not limited to, one or more of a central processing unit (CPU), a processor core, an arithmetic logic unit (ALU), a digital signal processor, a microprocessor, a microcomputer, a field programmable gate array (FPGA), a programmable logic unit, a microprocessor, an application-specific integrated circuit (ASIC), etc. The receiver 1000, flag generator 1100, equalizer 1200 and equalization controller 1300 may also be referred to, in the present specification, as receiver circuit 1000, flag generator circuit 1100, equalizer circuit 1200 and equalization controller circuit 1300.

During a normal operation mode, the flag generator 1100 generates a flag signal FLG without an external command. In other words, the flag signal FLG is internally generated by the flag generator 1100 without external control. For example, the flag generator 1100 may include at least one sensor and/or at least one sensing circuit. Detailed examples of a configuration of the flag generator 1100 will be described with reference to FIGS. 7A and 7B.

During the normal operation mode, the equalizer 1200 receives the input data signal DS through a channel, generates an equalized signal ES by equalizing the input data signal DS based on an equalization coefficient CEQ, and generates a data sample signal DSS including a plurality of data bits based on the equalized signal ES. For example, the equalizer 1200 may include a decision feedback equalizer (DFE). According to at least some example embodiments, the DFE included in the equalizer 1200 may be embodied by a circuit or circuitry. Thus, the DFE included in the equalizer 1200 may also be referred to, in the present specification, as a DFE circuit. Detailed examples of a configuration of the equalizer 1200 will be described with reference to FIGS. 6, 8A and 8B.

In some example embodiments, when the receiver 1000 is included in the memory device, the normal operation mode may be a write mode in which normal write data is received from an memory controller located outside the memory device and a data write operation is performed based on the normal write data. In other words, the input data signal DS and the data sample signal DSS may correspond to the normal write data. The memory device may perform the data write operation based on the plurality of data bits included in the data sample signal DSS.

In some example embodiments, when the receiver 1000 is included in the memory device, the flag generator 1100 may generate the flag signal FLG by itself without the external command provided from the memory controller during the normal operation mode.

During the normal operation mode, the equalization controller 1300 determines the amount of change in the equalization coefficient CEQ based on the flag signal FLG, the equalized signal ES and the data sample signal DSS, and performs a training operation in which the equalization coefficient CEQ is updated in real time (or during runtime) based on the amount of change in the equalization coefficient CEQ. For example, the equalization controller 1300 may set, determine, change and/or update the equalization coefficient CEQ based on constant modulus algorithm (CMA). Detailed examples of a configuration of the equalization controller 1300 will be described with reference to FIG. 6.

In some example embodiments, when the receiver 1000 is included in the memory device, the training operation performed by the equalization controller 1300 may be a background self-training operation. The background self-training operation may represent that the training operation is performed based on the normal write data during the normal operation mode, the training operation is internally performed by itself without a control of the memory controller, and the training operation is hidden with respect to the memory controller.

The data input pad 1010 is connected to the equalizer 1200, and receives the input data signal DS. For example, a pad may be a contact pad or a contact pin, but example embodiments are not limited thereto.

In a memory input/output (I/O) interface, a data signal is transmitted to a receiver through a channel. Recently, as the data rate increases, interference signals due to the channel influence may increase, and thus the characteristic and/or quality of a received signal may be degraded or deteriorated. To solve this problem, an equalization (or equalizing) technique has been used to restore the received signal by canceling or compensating the interference signals. As the influence of the interference signals increases due to an increase in the data rate, a higher level of the equalization technique is required. It is important to use or apply an equalization coefficient optimized or, alternatively, set to a desired level for canceling the interference signals and performing a proper equalization, and thus it is necessary to perform a training operation to determine the optimized or, alternatively, desired equalization coefficient.

In the receiver 1000 according to at least some example embodiments of the inventive concepts, a separate training mode may not be entered and/or a separate training sequence may not be performed when it is required to optimize the equalization coefficient CEQ used in the receiver 1000 or, alternatively, set the equalization coefficient CEQ used in the receiver 1000 to a desired value. The receiver 1000 may perform the background self-training operation, which is performed based on the normal write data during the normal operation mode, is internally performed by itself without the control of the memory controller, and is hidden with respect to the memory controller, to update the equalization coefficient CEQ in real time. Accordingly, the optimized or, alternatively, desired equalization coefficient CEQ may be efficiently determined or set while reducing or, alternatively, minimizing the degradation of system performance.

Figure 2:
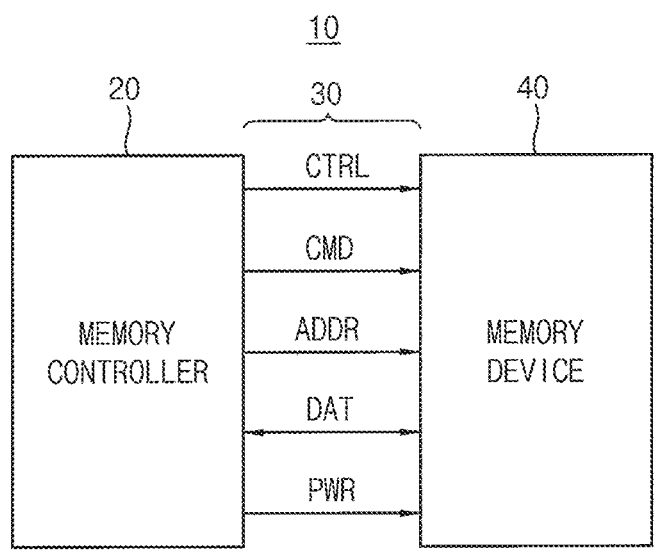
FIG. 2 is a block diagram illustrating a memory system according to at least some example embodiments of the inventive concepts.

FIG. 2 is a block diagram illustrating a memory system according to at least some example embodiments of the inventive concepts.

Referring to FIG. 2, a memory system 10 includes a memory controller 20 and a memory device 40. The memory system 10 may further include a plurality of signal lines 30 that electrically connect the memory controller 20 with the memory device 40.

The memory device 40 is controlled by the memory controller 20. For example, based on requests from a host (not illustrated), the memory controller 20 may store (e.g., write or program) data into the memory device 40, or may retrieve (e.g., read or sense) data from the memory device 40.

The plurality of signal lines 30 may include control lines, command lines, address lines, data input/output (I/O) lines and power lines. The memory controller 20 may transmit a command CMD, an address ADDR and a control signal CTRL to the memory device 40 via the command lines, the address lines and the control lines, may exchange a data signal DAT with the memory device 40 via the data I/O lines, and may transmit a power supply voltage PWR to the memory device 40 via the power lines. For example, the control signal CTRL may include a chip enable signal (/CE), a write enable signal (/WE), a read enable signal (/RE), a command latch enable signal (CLE), an address latch enable signal (ALE), etc.

Although not illustrated in FIG. 2, the plurality of signal lines 30 may further include data strobe signal (DQS) lines for transmitting a DQS signal. The DQS signal may be used to provide a reference time point for determining logic values of data exchanged between the memory controller 20 and the memory device 40. However, as illustrated in FIG. 2, the DQS signal may be omitted.

In some example embodiments, at least a part or all of the signal lines 30 may be referred to as a channel. The term "channel" as used herein may represent signal lines that include the data I/O lines for transmitting the data signal DAT. However, example embodiments are not limited thereto, and the channel may further include the command lines for transmitting the command CMD and/or the address lines for transmitting the address ADDR.

Figure 3A:
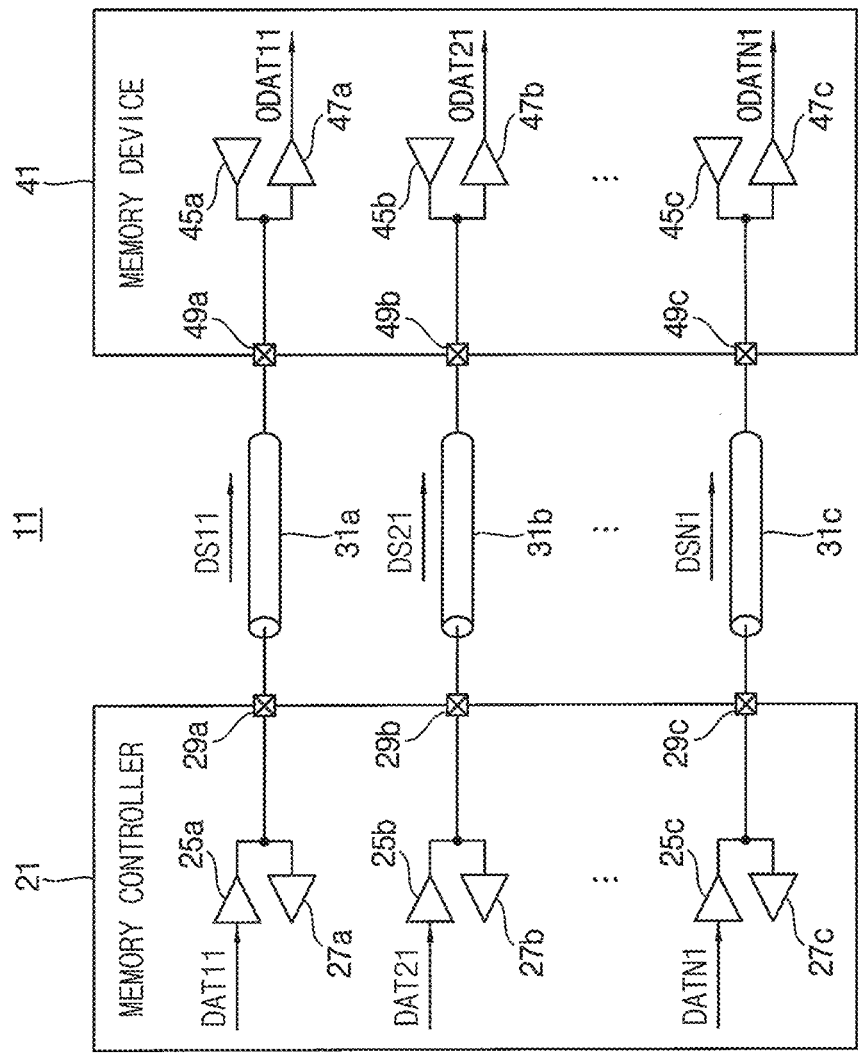
FIGS. 3A and 3B are block diagrams illustrating an example of a memory system of FIG. 2.
Figure 3B:
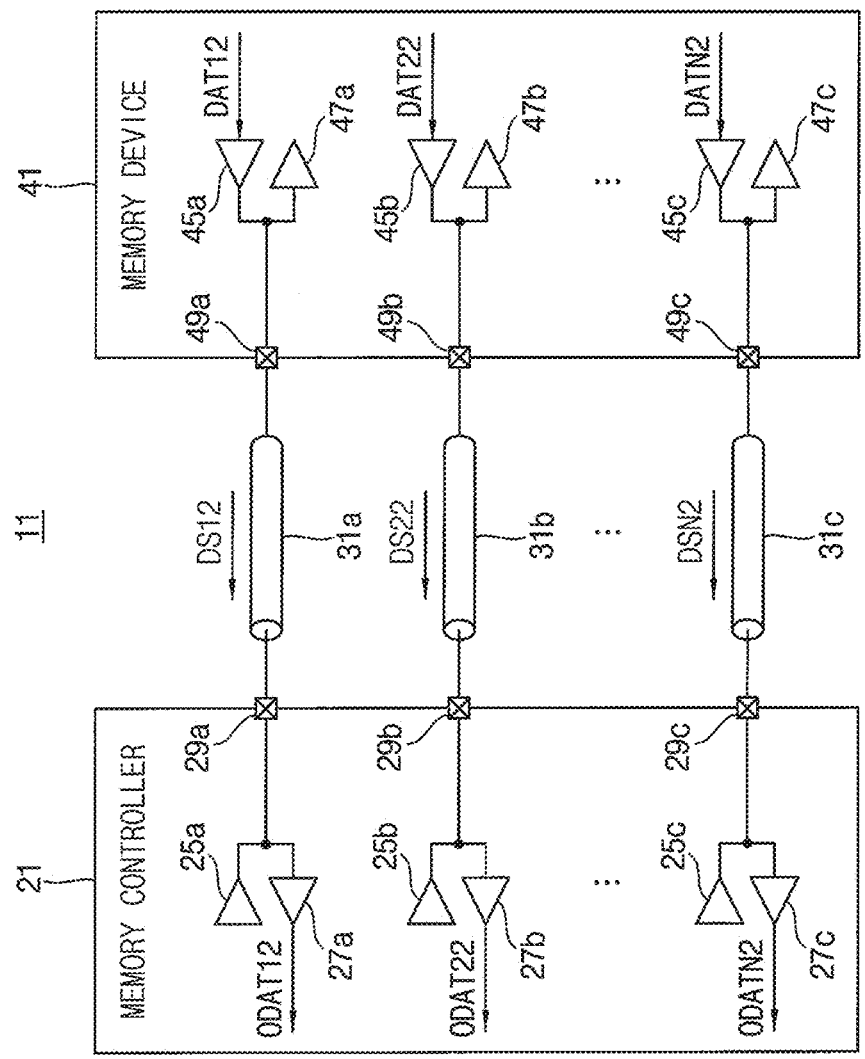

FIGS. 3A and 3B are block diagrams illustrating an example of a memory system of FIG. 2.

Referring to FIGS. 3A and 3B, a memory system 11 includes a memory controller 21, a memory device 41 and a plurality of channels 31a, 31b and 31c. For example, the number of the channels 31a, 31b and 31c may be N, where N is a natural number greater than or equal to two.

The memory controller 21 may include a plurality of transmitters 25a, 25b and 25c, a plurality of receivers 27a, 27b and 27c, and a plurality of data I/O pads 29a, 29b and 29c. The memory device 41 may include a plurality of transmitters 45a, 45b and 45c, a plurality of receivers 47a, 47b and 47c, and a plurality of data I/O pads 49a, 49b and 49c.

Each of the plurality of transmitters 25a, 25b, 25c, 45a, 45b and 45c may generate a data signal. Each of the plurality of receivers 27a, 27b, 27c, 47a, 47b and 47c may receive the data signal, and may be the receiver according to at least some example embodiments of the inventive concepts. For example, each of the receivers 27a, 27b, 27c, 47a, 47b and 47c may be the receiver 1000 described with reference to FIG. 1, and may be implemented based on examples which will be described with reference to FIGS. 6 through 14.

Each of the plurality of data I/O pads 29a, 29b, 29c, 49a, 49b and 49c may be connected to a respective one of the plurality of transmitters 25a, 25b, 25c, 45a, 45b and 45c and a respective one of the plurality of receivers 27a, 27b, 27c, 47a, 47b and 47c.

The plurality of channels 31a, 31b and 31c may connect the memory controller 21 with the memory device 41. Each of the plurality of channels 31a, 31b and 31c may be connected to a respective one of the plurality of transmitters 25a, 25b and 25c and a respective one of the plurality of receivers 27a, 27b and 27c through a respective one of the plurality of data I/O pads 29a, 29b and 29c. In addition, each of the plurality of channels 31a, 31b and 31c may be connected to a respective one of the plurality of transmitters 45a, 45b and 45c and a respective one of the plurality of receivers 47a, 47b and 47c through a respective one of the plurality of data I/O pads 49a, 49b and 49c. The data signal may be transmitted through each of the plurality of channels 31a, 31b and 31c.

FIG. 3A illustrates an operation of transferring data from the memory controller 21 to the memory device 41. For example, the transmitter 25a may generate a data signal DS11 based on input data DAT11, the data signal DS11 may be transmitted from the memory controller 21 to the memory device 41 through the channel 31a, and the receiver 47a may receive the data signal DS11 to obtain output data ODAT11 corresponding to the input data DAT11. Similarly, the transmitter 25b may generate a data signal DS21 based on input data DAT21, the data signal DS21 may be transmitted to the memory device 41 through the channel 31b, and the receiver 47b may receive the data signal DS21 to obtain output data ODAT21 corresponding to the input data DAT21. The transmitter 25c may generate a data signal DSN1 based on input data DATN1, the data signal DSN1 may be transmitted to the memory device 41 through the channel 31c, and the receiver 47c may receive the data signal DSN1 to obtain output data ODATN1 corresponding to the input data DATN1. For example, the input data DAT11, DAT21 and DATN1 and the output data ODAT11, ODAT21 and ODATN1 may be write data to be stored into the memory device 41. For example, the receivers 47a, 47b and 47c may perform the above-described background self-training operation during a write mode in which the write data is stored into the memory device 41. Although not illustrated in detail, a write command and a write address may also be provided to the memory device 41. The data I/O pads 49a, 49b and 49c may serve as data input pads of the receivers 47a, 47b and 47c, respectively.

FIG. 3B illustrates an operation of transferring data from the memory device 41 to the memory controller 21. For example, the transmitter 45a may generate a data signal DS12 based on input data DAT12, the data signal DS12 may be transmitted from the memory device 41 to the memory controller 21 through the channel 31a, and the receiver 27a may receive the data signal DS12 to obtain output data ODAT12 corresponding to the input data DAT12. Similarly, the transmitter 45b may generate a data signal DS22 based on input data DAT22, the data signal DS22 may be transmitted to the memory controller 21 through the channel 31b, and the receiver 27b may receive the data signal DS22 to obtain output data ODAT22 corresponding to the input data DAT22. The transmitter 45c may generate a data signal DSN2 based on input data DATN2, the data signal DSN2 may be transmitted to the memory controller 21 through the channel 31c, and the receiver 27c may receive the data signal DSN2 to obtain output data ODATN2 corresponding to the input data DATN2. For example, the input data DAT12, DAT22 and DATN2 and the output data ODAT12, ODAT22 and ODATN2 may be read data retrieved from the memory device 41. For example, the receivers 27a, 27b and 27c may perform the above-described background self-training operation during a read mode in which the read data is retrieved from the memory device 41. Although not illustrated in detail, a read command and a read address may be provided to the memory device 41. The data I/O pads 29a, 29b and 29c may serve as data input pads of the receivers 27a, 27b and 27c, respectively.

Figure 4:
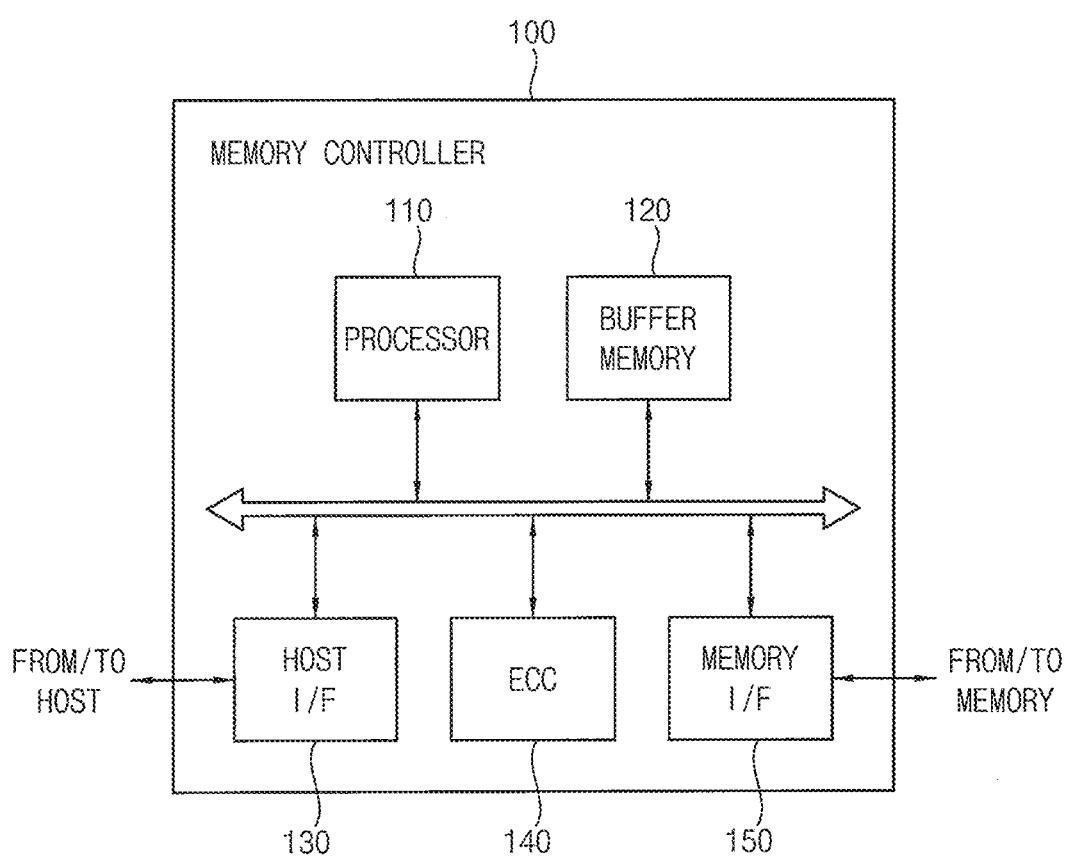
FIG. 4 is a block diagram illustrating an example of a memory controller included in a memory system according to at least some example embodiments of the inventive concepts.

FIG. 4 is a block diagram illustrating an example of a memory controller included in a memory system according to at least some example embodiments of the inventive concepts.

Referring to FIG. 4, a memory controller 100 may include at least one processor 110, a buffer memory 120, a host interface 130, an error correction code (ECC) block 140 and a memory interface 150.

The processor 110 may control an operation of the memory controller 100 in response to a command and/or request received via the host interface 130 from an external host (not illustrated). For example, the processor 110 may control respective components by employing firmware for operating a memory device (e.g., the memory device 40 in FIG. 2).

The buffer memory 120 may store instructions and data executed and processed by the processor 110. For example, the buffer memory 120 may be implemented with a volatile memory device such as a dynamic random access memory (DRAM), a static random access memory (SRAM), a cache memory, or the like.

The host interface 130 may provide physical connections between the host and the memory controller 100. The host interface 130 may provide an interface corresponding to a bus format of the host for communication between the host and the memory controller 100. In some example embodiments, the bus format of the host may be a small computer system interface (SCSI) or a serial attached SCSI (SAS) interface. In other example embodiments, the bus format of the host may be a USB, a peripheral component interconnect (PCI) express (PCIe), an advanced technology attachment (ATA), a parallel ATA (PATA), a serial ATA (SATA), a nonvolatile memory (NVM) express (NVMe), etc., format.

The ECC block 140 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

The memory interface 150 may exchange data with the memory device. The memory interface 150 may transmit a command and an address to the memory device, and may transmit data to the memory device or receive data read from the memory device. Although not illustrated in FIG. 4, a transmitter (e.g., the transmitters 25a, 25b and 25c in FIG. 3A) that generates a data signal and a receiver (e.g., the receivers 27a, 27b and 27c in FIG. 3A) that receives the data signal according to at least some example embodiments of the inventive concepts may be included in the memory interface 150.

Figure 5A:
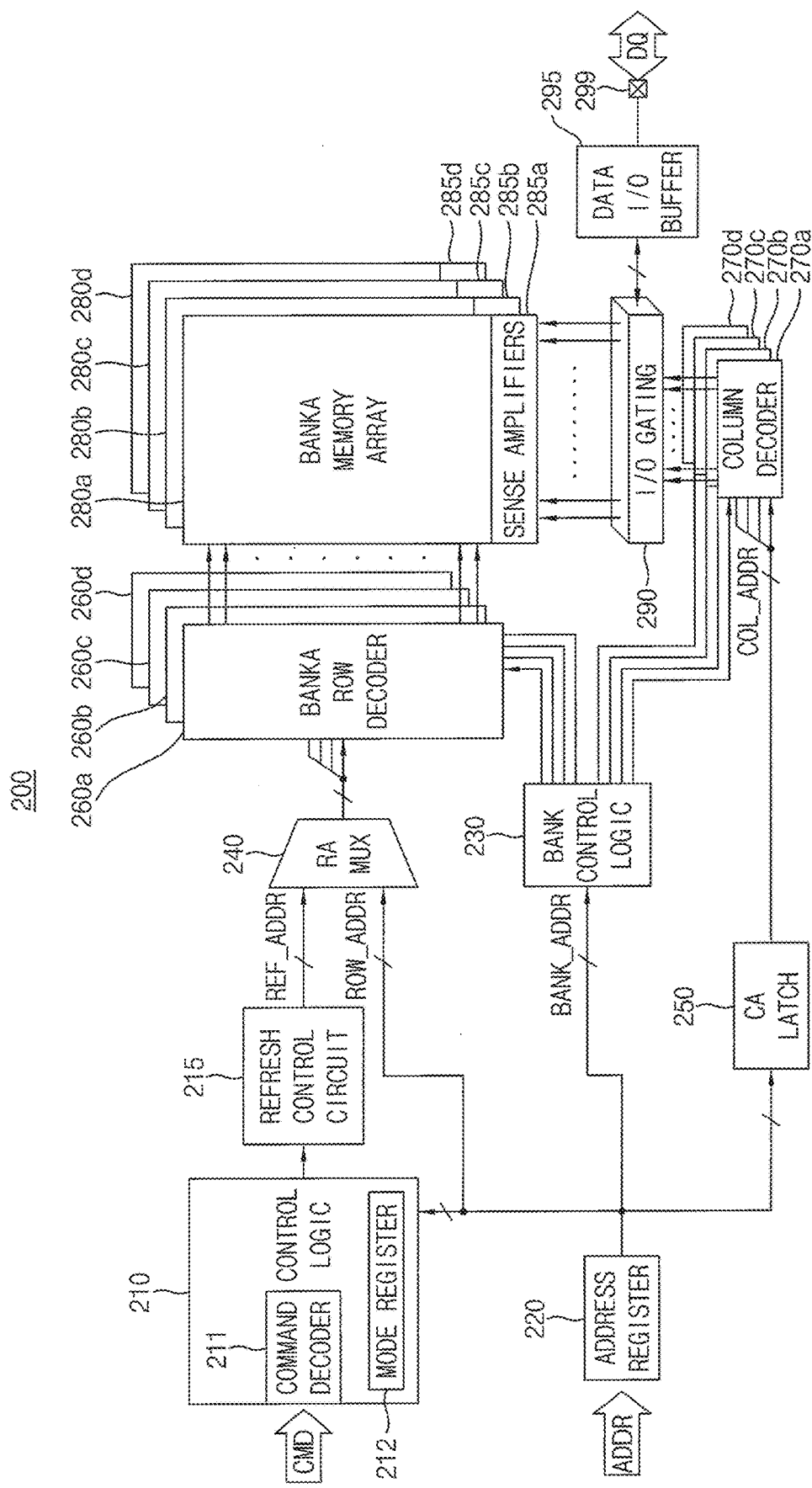
FIGS. 5A and 5B are block diagrams illustrating examples of a memory device included in a memory system according to at least some example embodiments of the inventive concepts.
Figure 5B:
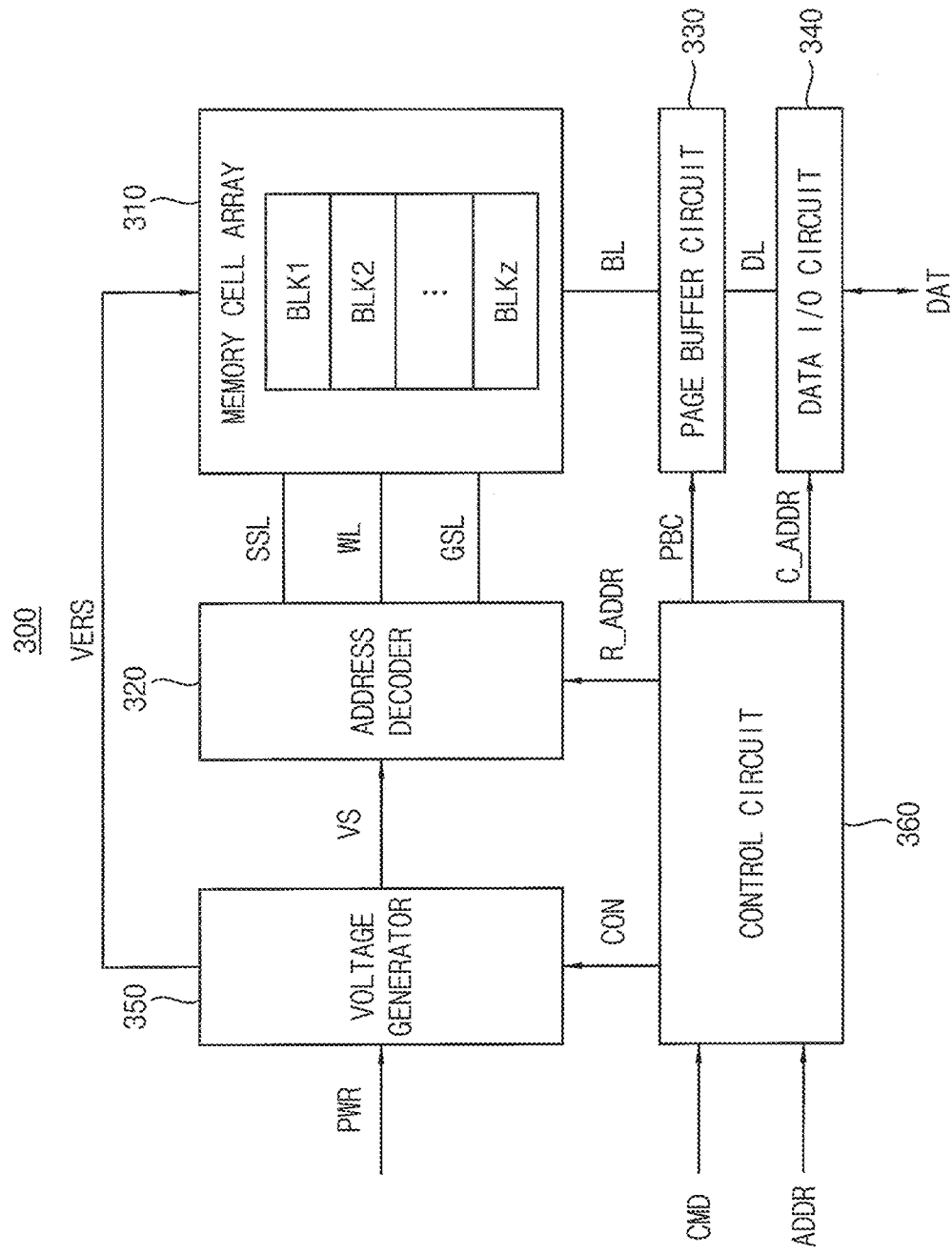

FIGS. 5A and 5B are block diagrams illustrating examples of a memory device included in a memory system according to at least some example embodiments of the inventive concepts.

Referring to FIG. 5A, a memory device 200 includes a control logic 210, a refresh control circuit 215, an address register 220, a bank control logic 230, a row address multiplexer 240, a column address latch 250, a row decoder, a column decoder, a memory cell array, a sense amplifier unit, an input/output (I/O) gating circuit 290, a data I/O buffer 295 and a data I/O pad 299. In some example embodiments, the memory device 200 may be, e.g., a volatile memory device. For example, the memory device 200 may be one of various volatile memory devices such as a dynamic random access memory (DRAM).

The memory cell array may include a plurality of memory cells. The memory cell array may include a plurality of bank arrays, e.g., first through fourth bank arrays 280a, 280b, 280c and 280d. The row decoder may include a plurality of bank row decoders, e.g., first through fourth bank row decoders 260a, 260b, 260c and 260d connected to the first through fourth bank arrays 280a, 280b, 280c and 280d, respectively. The column decoder may include a plurality of bank column decoders, e.g., first through fourth bank column decoders 270a, 270b, 270c and 270d connected to the first through fourth bank arrays 280a, 280b, 280c and 280d, respectively. The sense amplifier unit may include a plurality of bank sense amplifiers, e.g., first through fourth bank sense amplifiers 285a, 285b, 285c and 285d connected to the first through fourth bank arrays 280a, 280b, 280c and 280d, respectively.

The first through fourth bank arrays 280a to 280d, the first through fourth bank row decoders 260a to 260d, the first through fourth bank column decoders 270a to 270d, and the first through fourth bank sense amplifiers 285a to 285d may form first through fourth banks, respectively. For example, the first bank array 280a, the first bank row decoder 260a, the first bank column decoder 270a, and the first bank sense amplifier 285a may form the first bank; the second bank array 280b, the second bank row decoder 260b, the second bank column decoder 270b, and the second bank sense amplifier 285b may form the second bank; the third bank array 280c, the third bank row decoder 260c, the third bank column decoder 270c, and the third bank sense amplifier 285c may form the third bank; and the fourth bank array 280d, the fourth bank row decoder 260d, the fourth bank column decoder 270d, and the fourth bank sense amplifier 285d may form the fourth bank. Although FIG. 5A illustrates the memory device 200 including four banks, in other example embodiments, the memory device 200 may include any number of banks. Nor is there a requirement that the components shown in FIG. 5A in quantities of four have a one-to-one correspondence with each other. In other words, there could be more or less decoders or sensors than shown.

The address register 220 may receive an address ADDR including a bank address BANK_ADDR, a row address ROW_ADDR and a column address COL_ADDR from a memory controller (e.g., the memory controller 20 in FIG. 2). The address register 220 may provide the received bank address BANK_ADDR to the bank control logic 230, may provide the received row address ROW_ADDR to the row address multiplexer 240, and may provide the received column address COL_ADDR to the column address latch 250.

The bank control logic 230 may generate bank control signals in response to receipt of the bank address BANK_ADDR. One of the first through fourth bank row decoders 260a to 260d corresponding to the received bank address BANK_ADDR may be activated in response to the bank control signals generated by the bank control logic 230, and one of the first through fourth bank column decoders 270a to 270d corresponding to the received bank address BANK_ADDR may be activated in response to the bank control signals generated by the bank control logic 230.

The refresh control circuit 215 may generate a refresh address REF_ADDR in response to receipt of a refresh command or entrance of any self-refresh mode. For example, the refresh control circuit 215 may include a refresh counter that is configured to sequentially change the refresh address REF_ADDR from a first address of the memory cell array to a last address of the memory cell array. The refresh control circuit 215 may receive control signals from the control logic 210.

The row address multiplexer 240 may receive the row address ROW_ADDR from the address register 220, and may receive the refresh address REF_ADDR from the refresh control circuit 215. The row address multiplexer 240 may selectively output the row address ROW_ADDR or the refresh address REF_ADDR. A row address output from the row address multiplexer 240 (e.g., the row address ROW_ADDR or the refresh address REF_ADDR) may be applied to the first through fourth bank row decoders 260a to 260d.

The activated one of the first through fourth bank row decoders 260a to 260d may decode the row address output from the row address multiplexer 240, and may activate a wordline corresponding to the row address. For example, the activated bank row decoder may apply a wordline driving voltage to the wordline corresponding to the row address.

The column address latch 250 may receive the column address COL_ADDR from the address register 220, and may temporarily store the received column address COL_ADDR. The column address latch 250 may apply the temporarily stored or received column address COL_ADDR to the first through fourth bank column decoders 270a to 270d.

The activated one of the first through fourth bank column decoders 270a to 270d may decode the column address COL_ADDR output from the column address latch 250, and may control the I/O gating circuit 290 to output data corresponding to the column address COL_ADDR.

The I/O gating circuit 290 may include a circuitry for gating I/O data. For example, although not illustrated in FIG. 5A, the I/O gating circuit 290 may include an input data mask logic, read data latches for storing data output from the first through fourth bank arrays 280a to 280d, and write drivers for writing data to the first through fourth bank arrays 280a to 280d.

Data DQ to be read from one of the first through fourth bank arrays 280a to 280d may be sensed by a sense amplifier coupled to the one bank array, and may be stored in the read data latches. The data DQ stored in the read data latches may be provided to the memory controller via the data I/O buffer 295 and the data I/O pad 299. Data DQ received via the data I/O pad 299 that are to be written to one of the first through fourth bank arrays 280a to 280d may be provided from the memory controller to the data I/O buffer 295. The data DQ received via the data I/O pad 299 and provided to the data I/O buffer 295 may be written to the one bank array via the write drivers in the I/O gating circuit 290. Although not illustrated in FIG. 5A, a transmitter (e.g., the transmitters 45a, 45b and 45c in FIG. 3A) that generates a data signal and a receiver (e.g., the receivers 47a, 47b and 47c in FIG. 3A) that receives the data signal according to at least some example embodiments of the inventive concepts may be included in the data I/O buffer 295.

The control logic 210 may control an operation of the memory device 200. For example, the control logic 210 may generate control signals for the memory device 200 to perform a data write operation or a data read operation. The control logic 210 may include a command decoder 211 that decodes a command CMD received from the memory controller and a mode register 212 that sets an operation mode of the memory device 200. For example, the command decoder 211 may generate the control signals corresponding to the command CMD by decoding a write enable signal (e.g., /WE), a row address strobe signal (e.g., /RAS), a column address strobe signal (e.g., /CAS), a chip select signal (e.g., /CS), etc. The control logic 210 may further receive a clock signal (e.g., CLK) and a clock enable signal (e.g., /CKE) for operating the memory device 200 in a synchronous manner.

Referring to FIG. 5B, a memory device 300 may include a memory cell array 310, an address decoder 320, a page buffer circuit 330, a data input/output (I/O) circuit 340, a voltage generator 350 and a control circuit 360. For example, the memory device 300 may be one of various nonvolatile memory devices such as a NAND flash memory device.

The memory cell array 310 is connected to the address decoder 320 via a plurality of string selection lines SSL, a plurality of wordlines WL and a plurality of ground selection lines GSL. The memory cell array 310 is further connected to the page buffer circuit 330 via a plurality of bitlines BL. The memory cell array 310 may include a plurality of memory cells (e.g., a plurality of nonvolatile memory cells) that are connected to the plurality of wordlines WL and the plurality of bitlines BL. The memory cell array 310 may be divided into a plurality of memory blocks BLK1, BLK2, . . . , BLKz each of which includes memory cells. In addition, each of the plurality of memory blocks BLK1, BLK2, . . . , BLKz may be divided into a plurality of pages.

In some example embodiments, the plurality of memory cells may be arranged in a two-dimensional (2D) array structure or a three-dimensional (3D) vertical array structure. A three-dimensional vertical array structure may include vertical cell strings that are vertically oriented such that at least one memory cell is located over another memory cell. The at least one memory cell may comprise a charge trap layer. The following patent documents, which are hereby incorporated by reference in their entirety, describe suitable configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and US Pat. Pub. No. 2011/0233648.

The control circuit 360 receives a command CMD and an address ADDR from the outside (e.g., from the memory controller 20 in FIG. 2), and control erasure, programming and read operations of the memory device 300 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recovery read operation.

For example, the control circuit 360 may generate control signals CON, which are used for controlling the voltage generator 350, and may generate control signal PBC for controlling the page buffer circuit 330, based on the command CMD, and may generate a row address R_ADDR and a column address C_ADDR based on the address ADDR. The control circuit 360 may provide the row address R_ADDR to the address decoder 320 and may provide the column address C_ADDR to the data I/O circuit 340.

The address decoder 320 may be connected to the memory cell array 310 via the plurality of string selection lines SSL, the plurality of wordlines WL and the plurality of ground selection lines GSL.

For example, in the data erase/write/read operations, the address decoder 320 may determine at least one of the plurality of wordlines WL as a selected wordline, and may determine the rest or remainder of the plurality of wordlines WL other than the selected wordline as unselected wordlines, based on the row address R_ADDR.

In addition, in the data erase/write/read operations, the address decoder 320 may determine at least one of the plurality of string selection lines SSL as a selected string selection line, and may determine the rest or remainder of the plurality of string selection lines SSL other than the selected string selection line as unselected string selection lines, based on the row address R_ADDR.

Further, in the data erase/write/read operations, the address decoder 320 may determine at least one of the plurality of ground selection lines GSL as a selected ground selection line, and may determine the rest or remainder of the plurality of ground selection lines GSL other than the selected ground selection line as unselected ground selection lines, based on the row address R_ADDR.

The voltage generator 350 may generate voltages VS that are required for an operation of the memory device 300 based on a power PWR and the control signals CON. The voltages VS may be applied to the plurality of string selection lines SSL, the plurality of wordlines WL and the plurality of ground selection lines GSL via the address decoder 320. In addition, the voltage generator 350 may generate an erase voltage VERS that is required for the data erase operation based on the power PWR and the control signals CON.

For example, during the erase operation, the voltage generator 350 may apply the erase voltage VERS to a common source line and/or the bitline BL of a memory block (e.g., a selected memory block) and may apply an erase permission voltage (e.g., a ground voltage) to all wordlines of the memory block or a portion of the wordlines via the address decoder 320. In addition, during the erase verification operation, the voltage generator 350 may apply an erase verification voltage simultaneously to all wordlines of the memory block or sequentially to the wordlines one by one.

For example, during the program operation, the voltage generator 350 may apply a program voltage to the selected wordline and may apply a program pass voltage to the unselected wordlines via the address decoder 320. In addition, during the program verification operation, the voltage generator 350 may apply a program verification voltage to the selected wordline and may apply a verification pass voltage to the unselected wordlines via the address decoder 320.

In addition, during the normal read operation, the voltage generator 350 may apply a read voltage to the selected wordline and may apply a read pass voltage to the unselected wordlines via the address decoder 320. During the data recover read operation, the voltage generator 350 may apply the read voltage to a wordline adjacent to the selected wordline and may apply a recover read voltage to the selected wordline via the address decoder 320.

The page buffer circuit 330 may be connected to the memory cell array 310 via the plurality of bitlines BL. The page buffer circuit 330 may include a plurality of page buffers. In some example embodiments, each page buffer may be connected to one bitline. In other example embodiments, each page buffer may be connected to two or more bitlines.

The page buffer circuit 330 may store data DAT to be programmed into the memory cell array 310 or may read data DAT sensed from the memory cell array 310. In other words, the page buffer circuit 330 may operate as a write driver or a sensing amplifier according to an operation mode of the memory device 300.

The data I/O circuit 340 may be connected to the page buffer circuit 330 via data lines DL. The data I/O circuit 340 may provide the data DAT from the outside of the memory device 300 to the memory cell array 310 via the page buffer circuit 330 or may provide the data DAT from the memory cell array 310 to the outside of the memory device 300, based on the column address C_ADDR. Although not illustrated in FIG. 5B, a transmitter (e.g., the transmitters 45a, 45b and 45c in FIG. 3A) that generates a data signal and a receiver (e.g., the receivers 47a, 47b and 47c in FIG. 3A) that receives the data signal according to at least some example embodiments of the inventive concepts may be included in the data I/O circuit 340.

Figure 6:
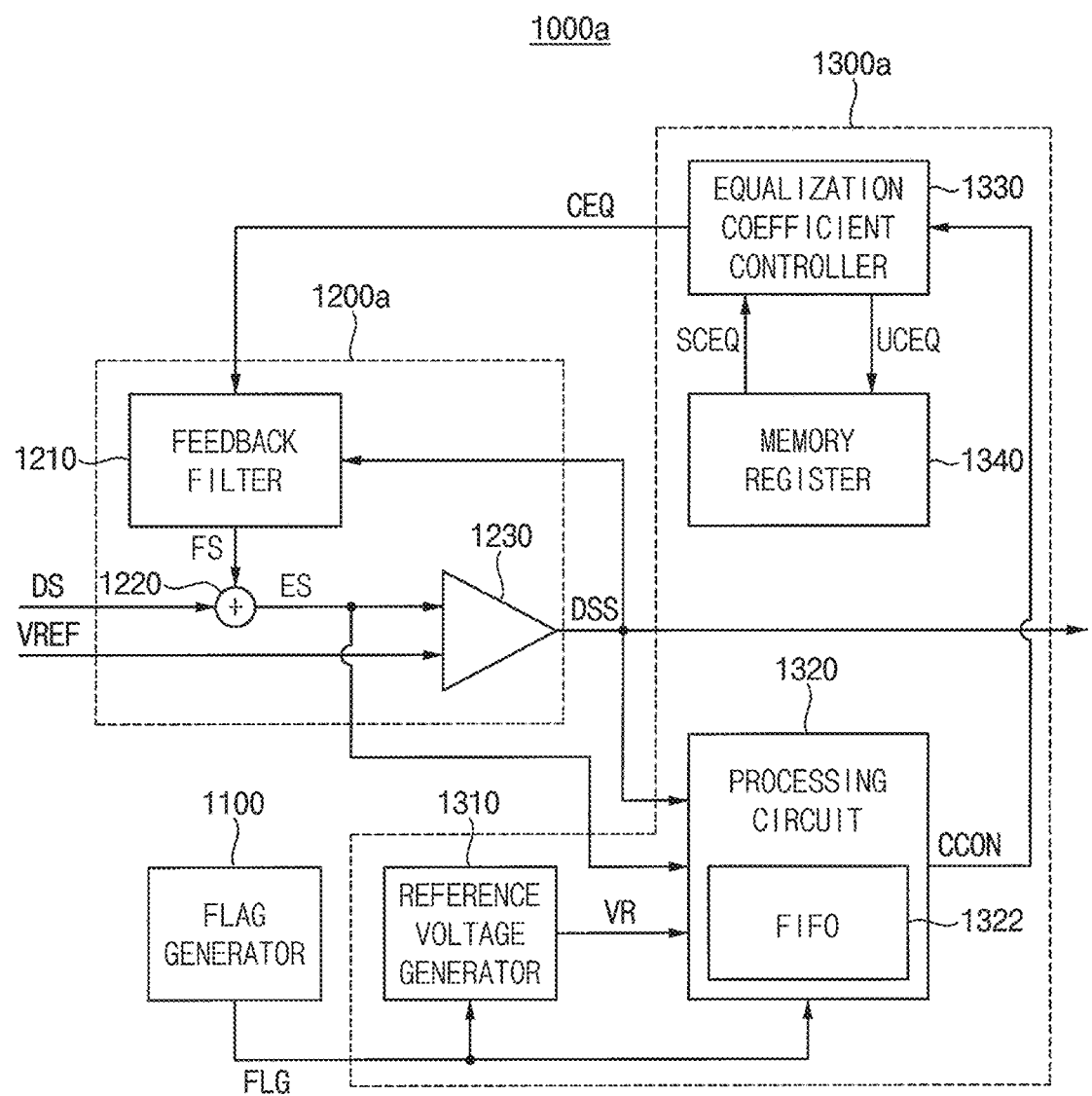
FIG. 6 is a block diagram illustrating an example of a receiver of FIG. 1.

FIG. 6 is a block diagram illustrating an example of a receiver of FIG. 1.

Referring to FIG. 6, a receiver 1000a includes a flag generator 1100, an equalizer 1200a and an equalization controller 1300a.

During the normal operation mode, the flag generator 1100 generates the flag signal FLG without the external command. The flag generator 1100 may be substantially the same as the flag generator 1100 in FIG. 1.

During the normal operation mode, the equalizer 1200a generates the equalized signal ES by equalizing the input data signal DS based on the equalization coefficient CEQ, and generates the data sample signal DSS including the plurality of data bits based on the equalized signal ES. The equalizer 1200a may include a feedback filter 1210, an adder 1220 and a sampling circuit 1230.

The feedback filter 1210 may generate a feedback signal FS based on the equalization coefficient CEQ and the data sample signal DSS. According to at least some example embodiments of the inventive concepts, the feedback filter 1210 may be embodied by a circuit or circuitry. For example, as will be described with reference to FIGS. 8A and 8B, the feedback filter 1210 may include at least one delay circuit and at least one multiplier. Thus, the Thus, the feedback filter 1210 may also be referred to, in the present specification, as the feedback filter circuit 1210.

The adder 1220 may add the feedback signal FS to the input data signal DS to generate the equalized signal ES.

The sampling circuit 1230 may generate the data sample signal DSS based on the equalized signal ES that is an output of the adder 1220 and a reference voltage VREF. The reference voltage VREF may be a voltage for determining a level of the input data signal DS. As will be described with reference to FIGS. 8A and 8B, the sampling circuit 1230 may include a decision circuit.

During the normal operation mode, the equalization controller 1300a determines the amount of change in the equalization coefficient CEQ based on the flag signal FLG, the equalized signal ES and the data sample signal DSS, and updates the equalization coefficient CEQ in real time based on the amount of change in the equalization coefficient CEQ. The equalization controller 1300a may include a reference voltage generator 1310, a processing circuit 1320 and an equalization coefficient controller 1330, and may further include a memory register 1340.

The reference voltage generator 1310 may generate a reference voltage VR based on the flag signal FLG. For example, when the flag signal FLG is activated, the reference voltage generator 1310 may generate the reference voltage VR having a predetermined or, alternatively, desired direct current (DC) level. In some example embodiments, a level of the reference voltage VR may be substantially the same as or different from a level of the reference voltage VREF. According to at least some example embodiments of the inventive concepts, the voltage generator 1310 may be embodied by a circuit or circuitry. Thus, the voltage generator 1310 may also be referred to, in the present specification, as the voltage generator circuit 1310.

The processing circuit 1320 may check whether the equalization coefficient CEQ is optimized or, alternatively, set to a desired level (e.g., whether the equalization coefficient CEQ is in an optimized or, alternatively, desired state) based on the flag signal FLG, the reference voltage VR, the equalized signal ES and the data sample signal DSS, may determine the amount of change in the equalization coefficient CEQ for optimizing the equalization coefficient CEQ or, alternatively, setting the equalization coefficient CEQ to a desired value when the equalization coefficient CEQ is not optimized or, alternatively, set to a desired level, and may output a control signal CCON representing the amount of change in the equalization coefficient CEQ. In other words, the processing circuit 1320 may determine increase/decrease directions of the equalization coefficient CEQ for optimizing the equalization coefficient CEQ or, alternatively, setting the equalization coefficient CEQ to a desired level.

In some example embodiments, the processing circuit 1320 may include a first-in first-out (FIFO) circuit 1322. For example, the FIFO circuit 1322 may sequentially store and output the data sample signal DSS.

In some example embodiments, the processing circuit 1320 may set, determine, change and/or update the equalization coefficient CEQ based on the CMA. Although not illustrated in FIG. 6, the processing circuit 1320 may include various logic circuits such as a comparator, an XNOR logic, or the like for performing the CMA. The reference voltage VR may be a voltage used to perform the CMA.

The equalization coefficient controller 1330 may update the equalization coefficient CEQ in real time based on the amount of change in the equalization coefficient CEQ, e.g., based on the control signal CCON. The equalization coefficient CEQ may be provided to the equalizer 1200a.

The memory register 1340 may store the equalization coefficient CEQ. The memory register 1340 may provide stored equalization coefficient SCEQ to the equalization coefficient controller 1330, and may receive and store updated equalization coefficient UCEQ from the equalization coefficient controller 1330. For example, when the background self-training operation is not performed, the stored equalization coefficient SCEQ provided from the memory register 1340 may be provided to the equalizer 1200a as the equalization coefficient CEQ. For example, while and after the background self-training operation is performed, the updated equalization coefficient UCEQ may be provided to the equalizer 1200a as the equalization coefficient CEQ.

In some example embodiments, at least a part of the processing circuit 1320 and/or the equalization coefficient controller 1330 may be implemented as hardware (e.g., circuitry and/or a processor executing program instructions). For example, at least a part of the processing circuit 1320 and/or the equalization coefficient controller 1330 may be included in a computer-based electronic system. In other example embodiments, at least a part of the processing circuit 1320 and/or the equalization coefficient controller 1330 may be implemented as instruction codes or program routines (e.g., a software program) executed by a processor. For example, the instruction codes or the program routines may be executed by a computer-based electronic system, and may be stored in any storage device located inside or outside the computer-based electronic system. The equalization coefficient controller 1330 may also be referred to, in the present specification, as the equalization coefficient controller circuit 1330.

Figure 7A:
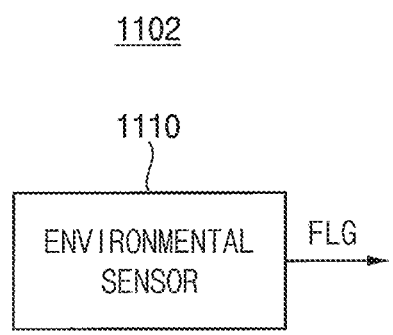
FIGS. 7A and 7B are block diagrams illustrating examples of a flag generator included in a receiver of FIG. 6.
Figure 7B:
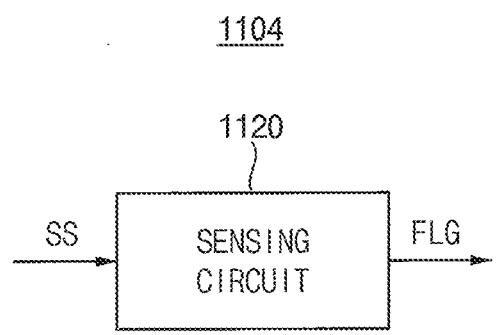

FIGS. 7A and 7B are block diagrams illustrating examples of a flag generator included in a receiver of FIG. 6.

Referring to FIG. 7A, a flag generator 1102 may include an environmental sensor 1110.

The environmental sensor 1110 may generate the flag signal FLG by detecting a change in an operating environment (or a surrounding environment) of the receiver 1000a, e.g., by detecting a change in an operating environment of a memory device and/or a memory system including the receiver 1000a. For example, the environmental sensor 1110 may activate the flag signal FLG when the operating environment changes to out of a predetermined or, alternatively, desired reference range.

In some example embodiments, the environmental sensor 1110 may include at least one of a temperature sensor, a humidity sensor, a pressure sensor, a motion sensor, a temporal sensor, a spatial sensor, an illumination sensor, an acceleration sensor, a vibration sensor, a mechanical stress sensor and a shock sensor. In other words, the operating environment may include at least one of temperature, humidity, pressure, motion, time, space, illuminance, acceleration, vibration, mechanical stress and shock. However, example embodiments are not limited thereto, and the environmental sensor 1110 may further include at least one sensor that collects environment information, such as an external force sensor, a radiation sensor, a dust sensor, an electrical stress sensor, or the like.

Referring to FIG. 7B, a flag generator 1104 may include a sensing circuit 1120.

The sensing circuit 1120 may generate the flag signal FLG by detecting a change in a state signal SS associated with or related to an operation of a memory device and/or a memory system including the receiver 1000a. For example, the sensing circuit 1120 may activate the flag signal FLG when the state signal SS changes to out of a predetermined or, alternatively, desired reference range.

In some example embodiments, the state signal SS may include at least one of an error rate signal representing a data error rate of the memory device, a frequency signal representing an operating frequency of the memory device, and a voltage signal representing a level of an operating voltage of the memory device. However, example embodiments are not limited thereto, and the state signal SS may further include at least one signal representing various operating states of the memory device.

Although not illustrated in FIGS. 7A and 7B, the flag generator may generate the flag signal FLG without any sensing operation. For example, the flag generator may regularly or periodically activate the flag signal FLG every predetermined or, alternatively, desired time interval, and may include a timer for regularly activating the flag signal FLG.

However, example embodiments are not limited thereto, and the flag generator may be implemented based on various schemes to generate the flag signal FLG without the external command.

Figure 8A:
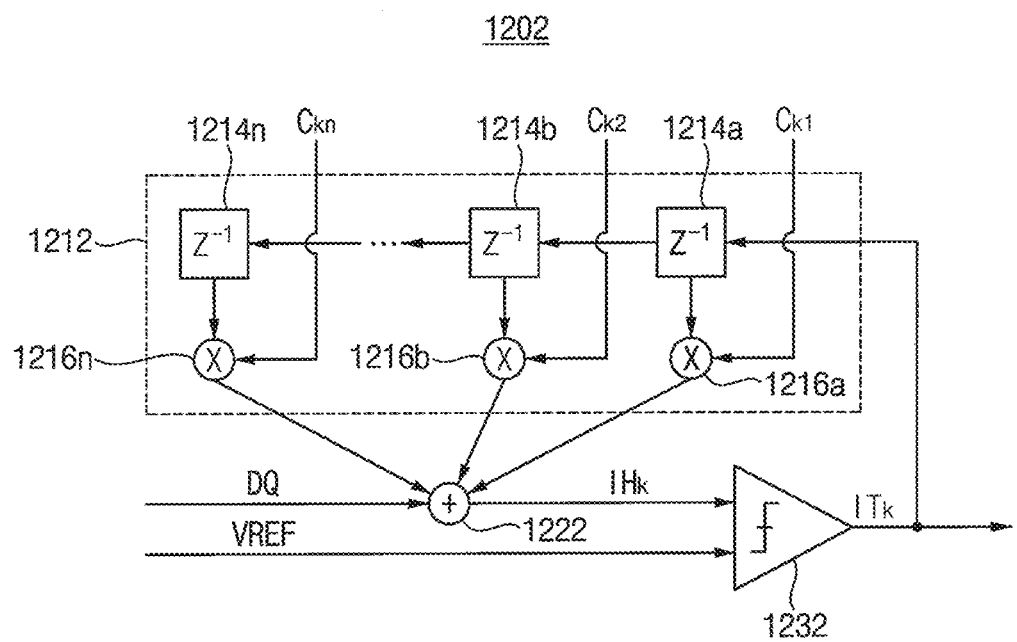
FIGS. 8A and 8B are block diagrams illustrating examples of an equalizer included in a receiver of FIG. 6.
Figure 8B:
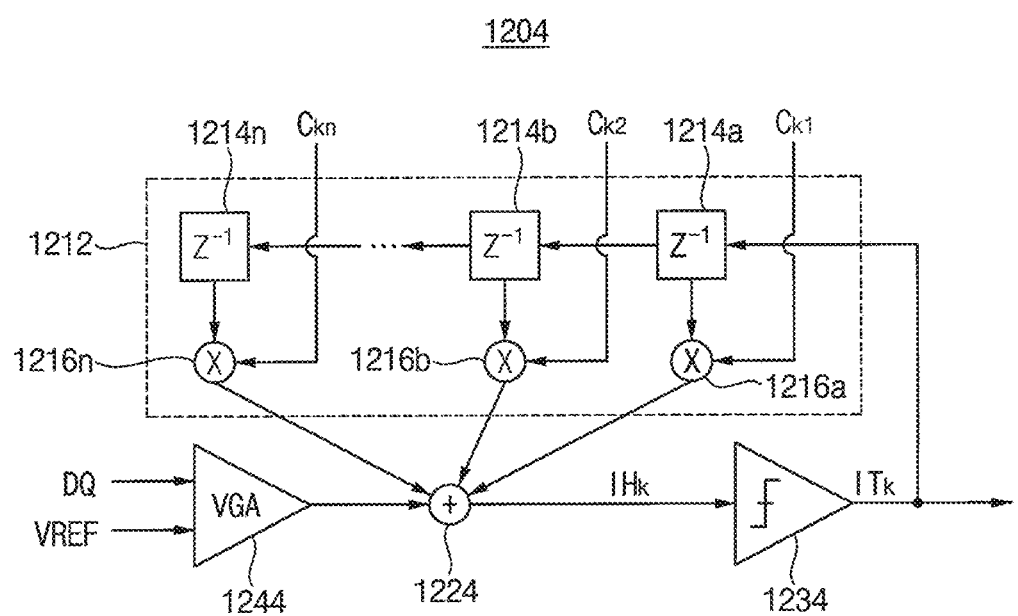

FIGS. 8A and 8B are block diagrams illustrating examples of an equalizer included in a receiver of FIG. 6.

Referring to FIG. 8A, an equalizer 1202 may include a feedback filter 1212, an adder 1222 and a decision circuit 1232. For example, the equalizer 1202 may be a DFE circuit.

For example, the equalizer 1202 may be an n-tap DFE circuit where n is a natural number.

In an example of FIG. 8A, DQ represents original data, e.g., the input data signal DS in FIG. 6, $IH_k$ represents the equalized signal ES in FIG. 6, and $IT_k$ represents the data sample signal DSS in FIG. 6. In addition, $C_{k1}, C_{k2}, \ldots, C_{kn}$ represent a plurality of equalization coefficients (e.g., n equalization coefficients) included in the equalization coefficient CEQ in FIG. 6.

The feedback filter 1212 may include a plurality of delay circuits (e.g., n delay circuits) 1214a, 1214b, ..., 1214n and a plurality of multipliers (e.g., n multipliers) 1216a, 1216b, ... 1216n.

The plurality of delay circuits 1214a, 1214b, ..., 1214n may sequentially delay the data sample signal $IT_k$. For example, the delay circuit 1214a may delay the data sample signal $IT_k$, the delay circuit 1214b may delay an output of the delay circuit 1214a, and the delay circuit 1214n may delay an output of a delay circuit at the previous stage.

The plurality of multipliers 1216a, 1216b, ... 1216n may multiply outputs of the plurality of delay circuits 1214a, 1214b, ..., 1214n by the plurality of equalization coefficients $C_{k1}, C_{k2}, \ldots, C_{kn}$. For example, the multiplier 1216a may multiply the output of the delay circuit 1214a by the equalization coefficient $C_{k1}$, the multiplier 1216b may multiply the output of the delay circuit 1214b by the equalization coefficient $C_{k2}$, and the multiplier 1216n may multiply the output of the delay circuit 1214n by the equalization coefficient $C_{kn}$.

The adder 1222 may generate the equalized signal $IH_k$ by adding an output of the feedback filter 1212, which is the outputs of the plurality of multipliers 1216a, 1216b, ..., 1216n, to the input data signal DQ.

The decision circuit 1232 may generate the data sample signal $IT_k$ based on the equalized signal $IH_k$ and the reference voltage VREF. In some example embodiments, the decision circuit 1232 may be referred to as a slicer, and the data sample signal $IT_k$ may be referred to as a slicer output signal.

Referring to FIG. 8B, an equalizer 1204 may include a feedback filter 1212, an adder 1224, a decision circuit 1234 and a variable gain amplifier (VGA) 1244. The descriptions repeated with FIG. 8A will be omitted.

The feedback filter 1212 may be substantially the same as the feedback filter 1212 in FIG. 8A. The VGA 1244 may receive the input data signal DQ and the reference voltage VREF. The adder 1224 may generate the equalized signal $IH_k$ by adding an output of the feedback filter 1212, which is the outputs of the plurality of multipliers 1216a, 1216b, ..., 1216n, to an output of the VGA 1244. The decision circuit 1234 may generate the data sample signal $IT_k$ based on the equalized signal $IH_k$.

As illustrated in FIGS. 8A and 8B, when each of the equalizers 1202 and 1204 is the n-tap DFE circuit, the processing circuit 1320 in FIG. 6 may perform a coefficient setting operation, which is the background self-training operation according to at least some example embodiments of the inventive concepts, based on the Equation 1. According to at least some example embodiments of the inventive concepts, the coefficient setting operation may be a coefficient optimization operation.

$$C_{k+1} = C_k + \Delta \operatorname{sgn}(\hat{I}_k)\operatorname{sgn}(R_1 - |\hat{I}_k|)\tilde{I}_k \qquad \text{[Equation 1]}$$

In Equation 1, $C_k$ represents a current tap coefficient (or current equalization coefficient), $C_{k+1}$ represents an updated tap coefficient (or updated equalization coefficient), and each of the $C_k$ and $C_{k+1}$ corresponds to the plurality of equalization coefficients $C_{k1}, C_{k2}, \ldots, C_{kn}$. In addition, $\hat{I}_k$ represents the equalized signal $IH_k$, $\tilde{I}_k$ represents the data sample signal $IT_k$, $\Delta$ represents a predetermined or, alternatively, desired constant, $R_1$ represents the reference voltage VR generated from the reference voltage generator 1310 in FIG. 6, and sgn(.) represents a sign function. DQ may be an analog value and a scalar value, $\hat{I}_k$ may be an analog value and a scalar value, $\tilde{I}_k$ may be a digital value and a vector value, and $C_k$ may be a digital value and a vector value.

In Equation 1, the meaning that each of $\tilde{I}_k$ and $C_k$ is a vector value may represent that, for example, when the equalizer is a 3-tap DFE circuit, each variable is composed of a vector having three elements (e.g., a 1*3 vector), and elements of each variable composed of the vector correspond to each tap. For example, $C_1$ may represent a first tap coefficient, $C_2$ may represent a second tap coefficient, and $C_3$ may represent a third tap coefficient. In addition, $IT_1$ may represent data received before one unit interval (UI), $IT_2$ may represent data received before two UIs, and $IT_3$ may represent data received before three UIs.

Further, the data sample signal $IT_k$ illustrated in FIGS. 8A and 8B may be data determined by each of the decision circuits 1232 and 1234, which is the slicer of the DFE circuit, and thus may be a digital value and a scalar value (e.g., including only a single value). In contrast, $\tilde{I}_k$ in Equation 1 may be a set of the data sample signals $IT_k$, e.g., a vector (or a variable including a plurality of elements) obtained by storing $IT_1$ that is data before one UI, $IT_2$ that is data before two UIs, and $IT_3$ that is data before three UIs into the FIFO circuit 1322 included in the processing circuit 1320, when the equalizer is the 3-tap DFE circuit. In Equation 1, the coefficient setting operation may be performed using $\tilde{I}_k$ that is the vector.

The processing circuit 1320 may determine the increase/decrease directions of the equalization coefficients by processing the equalized signal $IH_k$ and the data sample signal $IT_k$ based on Equation 1. The equalization coefficient controller 1330 may change and/or update the equalization coefficients depending on the increase/decrease directions.

In some example embodiments, in an initial operation time, an initial training operation in which an initial value of the equalization coefficient is set based on an external command may be performed during a training mode. The initial training operation will be described with reference to FIGS. 13 and 14.

Figure 9:
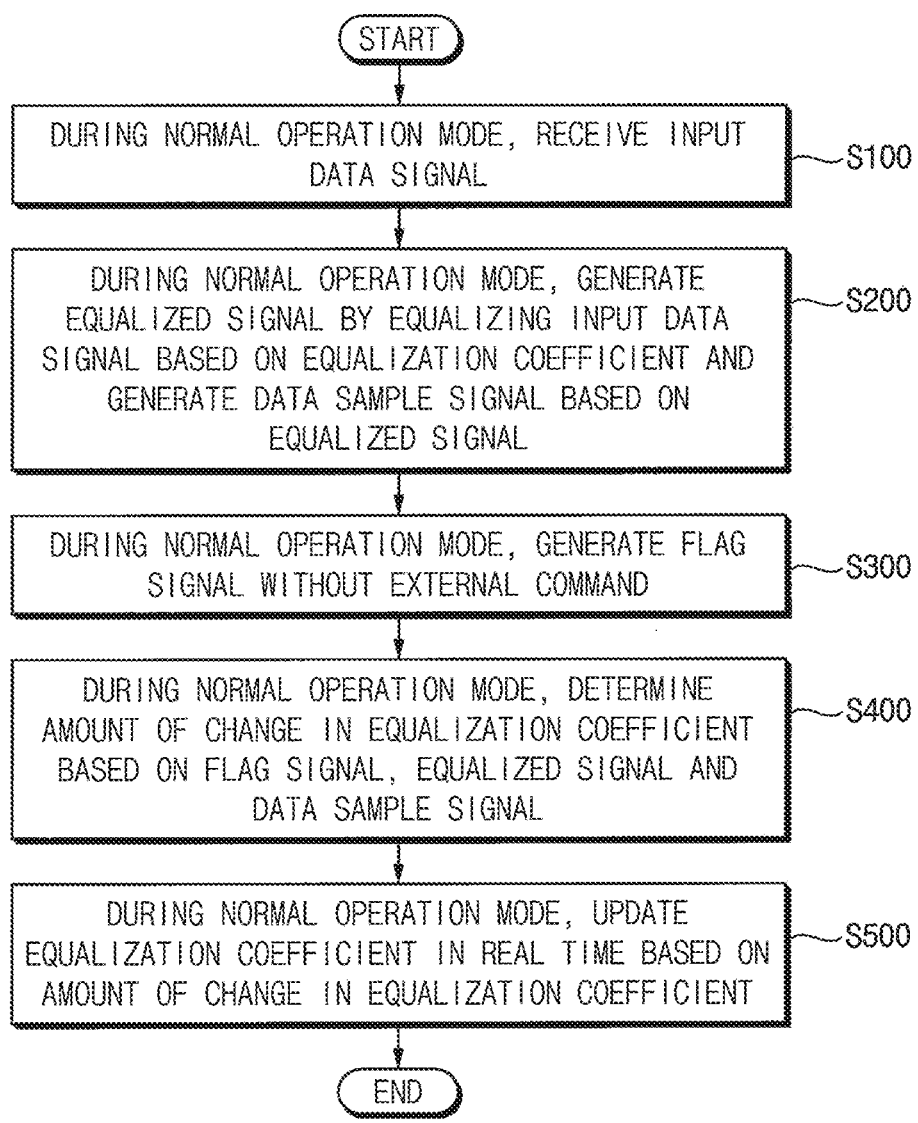
FIG. 9 is a flowchart illustrating a method of receiving data according to at least some example embodiments of the inventive concepts.

FIG. 9 is a flowchart illustrating a method of receiving data according to at least some example embodiments of the inventive concepts.

Referring to FIGS. 1 and 9, a method of receiving data according to at least some example embodiments of the inventive concepts is performed by the receiver 1000 performing the background training according to at least some example embodiments of the inventive concepts. For example, the receiver 1000 may be implemented as described with reference to FIGS. 1 through 8.

In the method of receiving data according to at least some example embodiments of the inventive concepts, during the normal operation mode, the input data signal DS is received through the channel (step S100). During the normal operation mode, the equalized signal ES is generated by equalizing the input data signal DS based on the equalization coefficient CEQ, and the data sample signal DSS including the plurality of data bits is generated based on the equalized signal ES. (step S200). For example, steps S100 and S200 may be performed by the equalizer 1200. For example, the normal operation mode may be the write mode, and the data write operation may be performed based on the data sample signal DSS generated by steps S100 and S200.

During the normal operation mode, the flag signal FLG is generated without the external command (step S300). For example, step S300 may be performed by the flag generator 1100. Step S300 will be described with reference to FIGS. 10 and 11.

During the normal operation mode, the amount of change in the equalization coefficient CEQ is determined based on the flag signal FLG, the equalized signal ES and the data sample signal DSS (step S400). During the normal operation mode, the equalization coefficient CEQ is updated in real time based on the amount of change in the equalization coefficient (step S500). For example, steps S400 and S500 may be performed by the equalization controller 1300. For example, the training operation performed by steps S400 and S500 may be the background self-training operation. Step S400 will be described with reference to FIG. 12.

Figure 10:
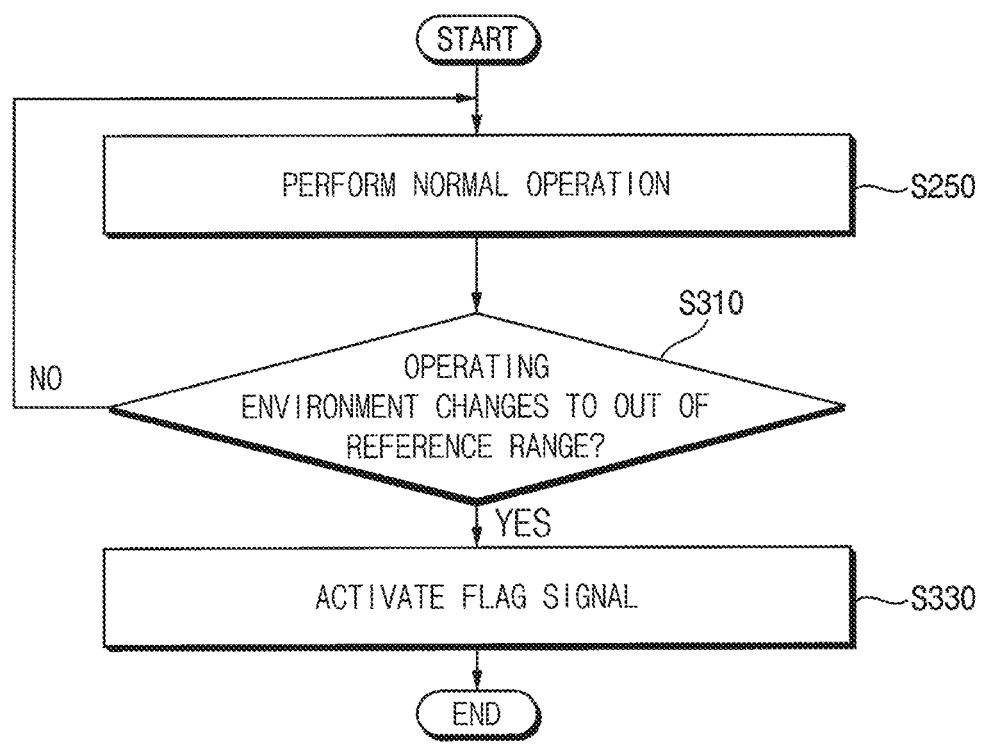
FIGS. 10 and 11 are flowcharts illustrating examples of generating a flag signal in FIG. 9.
Figure 11:
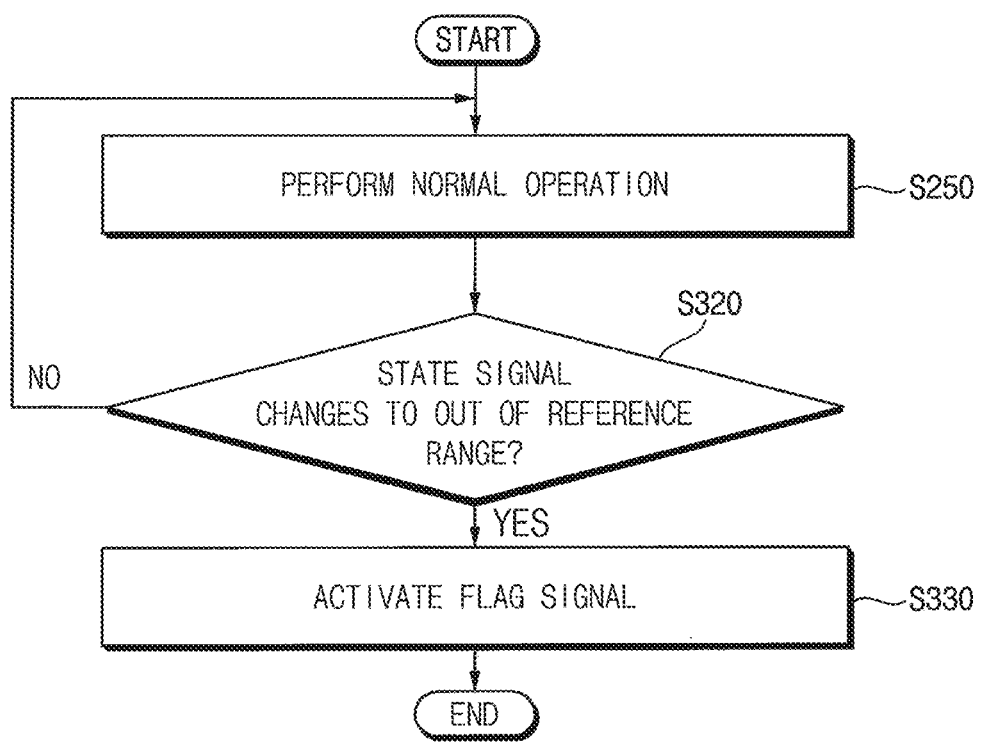

FIGS. 10 and 11 are flowcharts illustrating examples of generating a flag signal in FIG. 9.

Referring to FIGS. 7A, 9 and 10, when generating the flag signal FLG (step S300), a normal operation may be performed based on the data sample signal DSS generated by steps S100 and S200 (step S250). For example, the normal operation may be the data write operation in which the normal write data provided from the memory controller located outside the memory device is received and stored.

It may be determined, based on or using the environmental sensor 1110, whether the operating environment changes to out of the predetermined or, alternatively, desired reference range (e.g., whether the operating environment changes so as to deviate from the predetermined or, alternatively, desired reference range) (step S310). When it is determined that the operating environment changes to out of the reference range (step S310: YES), the flag signal FLG may be activated (step S330). When it is determined that the operating environment is within the reference range (step S310: NO), steps S250 and S310 may be repeatedly performed.

Referring to FIGS. 7B, 9 and 11, when generating the flag signal FLG (step S300), step S250 may be substantially the same as step S250 in FIG. 10.

It may be determined, based on or using the sensing circuit 1120, whether the state signal SS associated with the operation of the memory device changes to out of a predetermined or, alternatively, desired reference range (e.g., whether the state signal SS changes so as to deviate from the predetermined or, alternatively, desired reference range) (step S320). When it is determined that the state signal SS changes to out of the reference range (step S320: YES), the flag signal FLG may be activated (step S330). When it is determined that the status signal SS is within the reference range (step S320: NO), steps S250 and S320 may be repeatedly performed.

Figure 12:
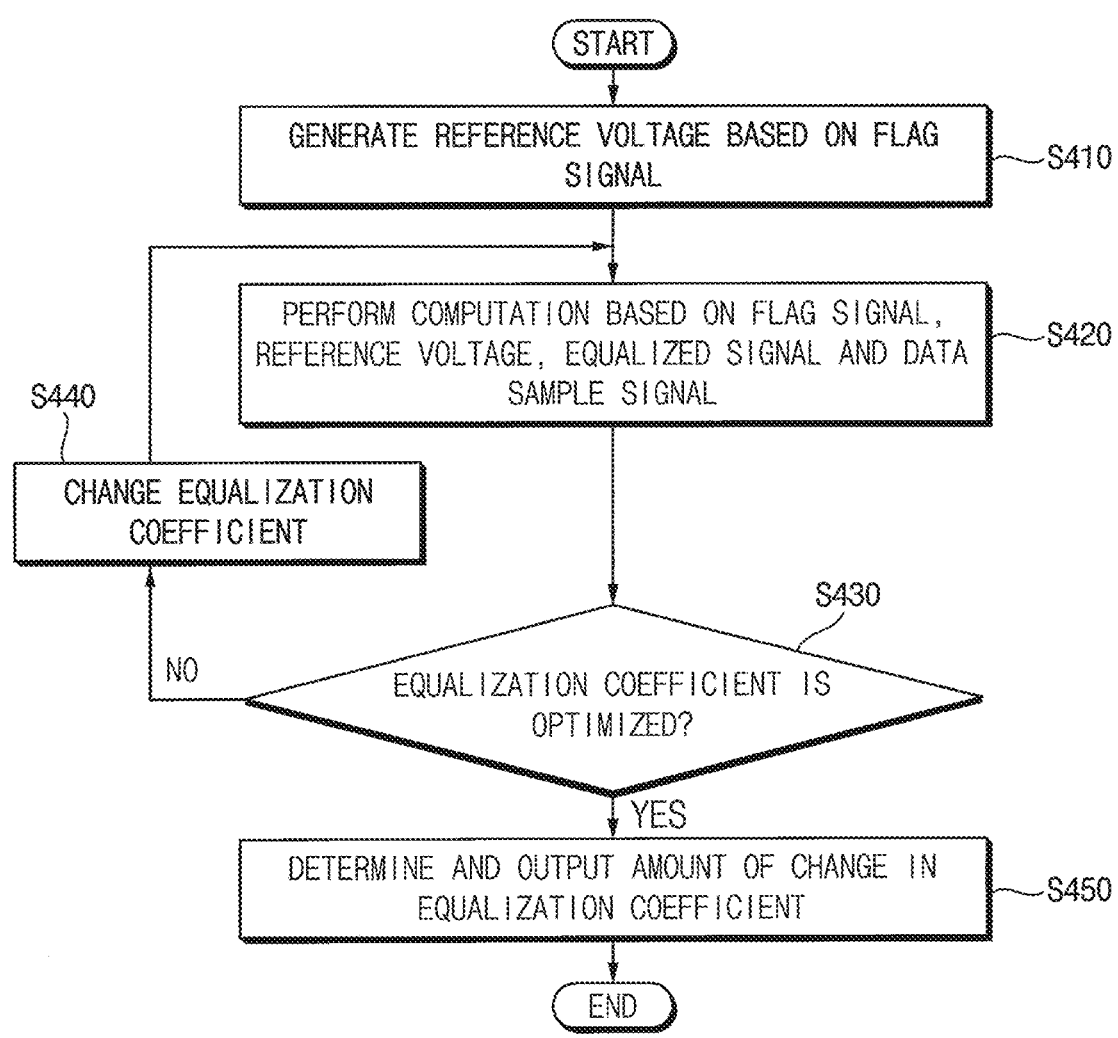
FIG. 12 is a flowchart illustrating an example of determining the amount of change in an equalization coefficient in FIG. 9.

FIG. 12 is a flowchart illustrating an example of determining the amount of change in an equalization coefficient in FIG. 9.

Referring to FIGS. 6, 9 and 12, when determining the amount of change in the equalization coefficient CEQ (step S400), the reference voltage VR may be generated based on the flag signal FLG (step S410). For example, step S410 may be performed by the reference voltage generator 1310.

A computation (or calculation, processing) may be performed based on the flag signal FLG, the reference voltage VR, the equalized signal ES and the data sample signal DSS (step S420). It may be determined, based on a result of the computation, whether the equalization coefficient CEQ is optimized or, alternatively, set to a desired level (step S430). For example, the computation may be performed based on the CMA, and may be performed based on Equation 1. For example, steps S420 and S430 may be performed by the processing circuit 1320.

When the equalization coefficient CEQ is not optimized or, alternatively, set to a desired level (step S430: NO), the equalization coefficient CEQ may be changed (step S440), and steps S420 and S430 may be performed based on the changed equalization coefficient. For example, the increase/decrease directions of the equalization coefficient CEQ may be determined based on the CMA and Equation 1, and the equalization coefficient CEQ may be changed based on the increase/decrease directions. For example, step S440 may be performed by the processing circuit 1320.

When the equalization coefficient CEQ is optimized or, alternatively, set to a desired level (step S430: YES), the amount of change in the equalization coefficient CEQ by step S440 may be determined and output (step S450). For example, the amount of change in the equalization coefficient CEQ may correspond to a difference between a first equalization coefficient before the flag signal FLG is activated and a second equalization coefficient optimized or, alternatively, set to a desired level by steps S420, S430 and S440. For example, step S450 may be performed by the processing circuit 1320, and the processing circuit 1320 may output the control signal CCON representing the amount of change in the equalization coefficient CEQ.

In some example embodiments, when the first equalization coefficient and the second equalization coefficient are substantially equal to each other, e.g., when step S440 is not performed because the first equalization coefficient corresponds to the optimized or, alternatively, desired state, the amount of change in the equalization coefficient CEQ may be about zero. In other example embodiments, when the first equalization coefficient and the second equalization coefficient are different from each other, e.g., when step S440 is performed one or more times because the first equalization coefficient does not correspond to the optimized or, alternatively, desired state, the amount of change in the equalization coefficient CEQ may not be about zero. Thus, steps S430, S440 and S450 may be described as an operation of determining and outputting the amount of change in the equalization coefficient CEQ for optimizing the equalization coefficient CEQ or, alternative, setting the equalization coefficient CEQ to a desired level when the equalization coefficient CEQ is not optimized or, alternatively, set to a desired level.

Although not illustrated in detail, when updating the equalization coefficient CEQ in real time in FIG. 9 (step S500), the equalization coefficient CEQ may be updated and stored based on the amount of change in the equalization coefficient CEQ. For example, step S500 may be performed by the equalization coefficient controller 1330 and the memory register 1340.

After step S500 is completed, e.g., after the training operation is completed, the flag signal FLG may be deactivated.

Figure 13:
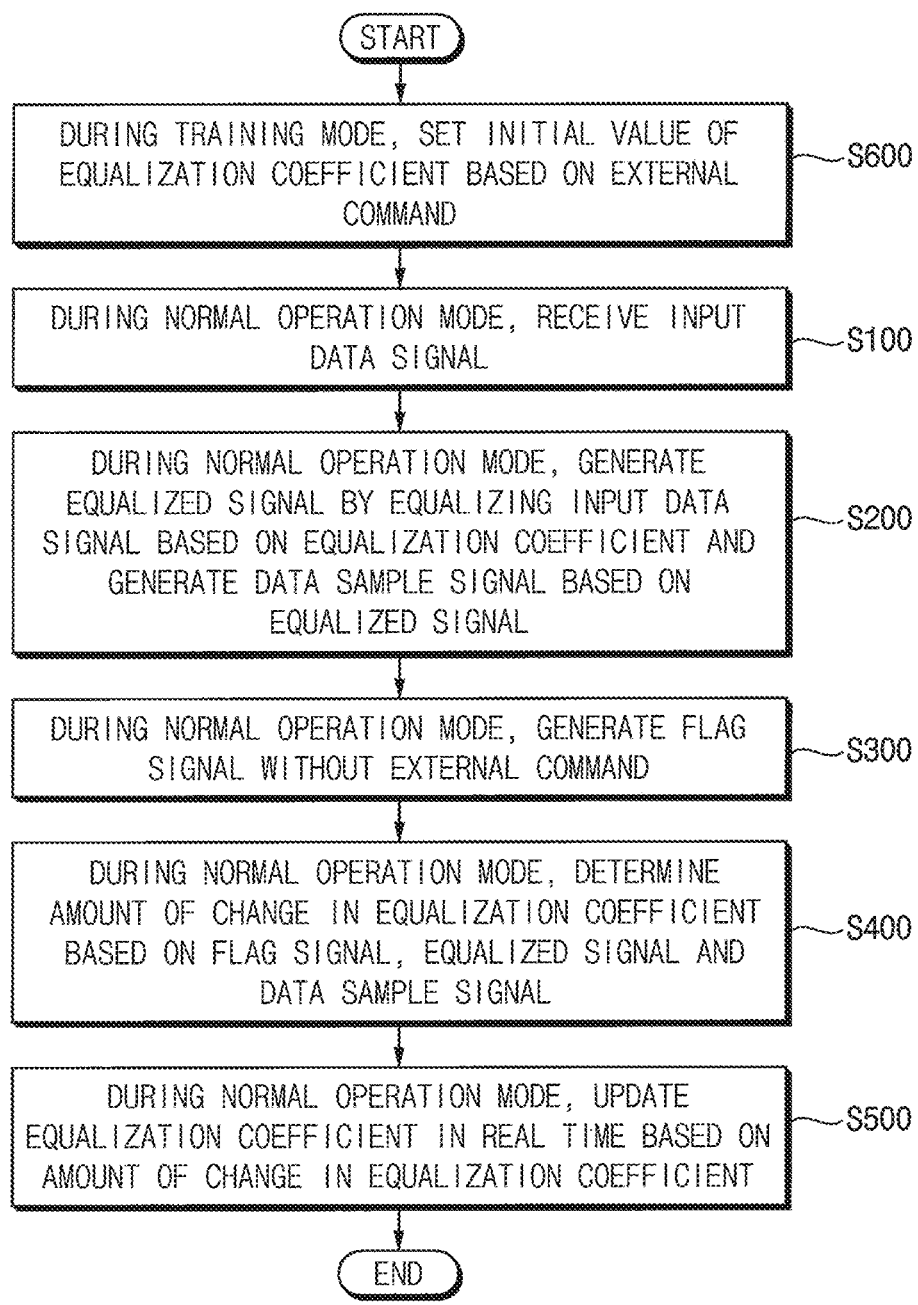
FIG. 13 is a flowchart illustrating a method of receiving data according to at least some example embodiments of the inventive concepts.

FIG. 13 is a flowchart illustrating a method of receiving data according to at least some example embodiments of the inventive concepts. The descriptions repeated with FIG. 9 will be omitted.

Referring to FIGS. 1 and 13, in a method of receiving data according to at least some example embodiments of the inventive concepts, during the training mode, the initial value of the equalization coefficient CEQ is set based on the external command (step S600). For example, when the receiver 1000 is powered on, e.g., when the memory device including the receiver 1000 is powered on, the memory device may enter the training mode and the initial training operation may be performed. For example, step S600 may be performed by the equalization controller 1300. Step S600 will be described with reference to FIG. 14.

After step S600 is performed, steps S100, S200, S300, S400 and S500 are sequentially performed. In other words, after the initial training operation is completed, the memory device may enter the normal operation mode, and the training operation may be performed during the normal operation mode. Steps S100, S200, S300, S400 and S500 may be substantially the same as steps S100, S200, S300, S400 and S500 in FIG. 9, respectively.

Figure 14:
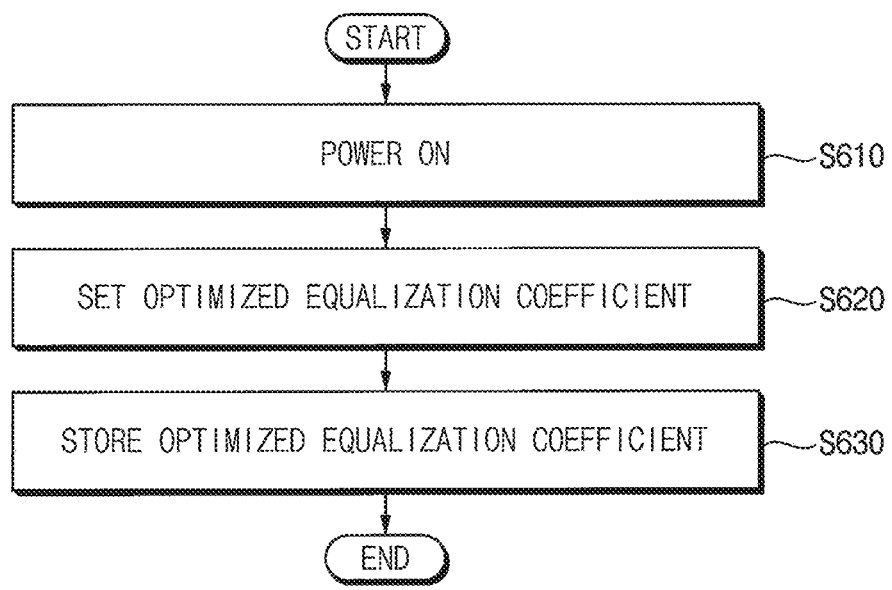
FIG. 14 is a flowchart illustrating an example of setting an initial value of an equalization coefficient in FIG. 13.

FIG. 14 is a flowchart illustrating an example of setting an initial value of an equalization coefficient in FIG. 13.

Referring to FIGS. 1, 13 and 14, when setting the initial value of the equalization coefficient (step S600), the receiver 1000 and the memory device may be powered on (step S610). The training mode may be entered and the optimized or, alternatively, desired equalization coefficient may be set during the training mode (step S620). The optimized or, alternatively, desired equalization coefficient may be stored (step S630). For example, steps S620 and S630 may be performed similarly to steps S400 and S500, except that steps S620 and S630 are performed during the training mode.

As will be appreciated by those skilled in the art, at least some example embodiments of the inventive concepts may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 15:
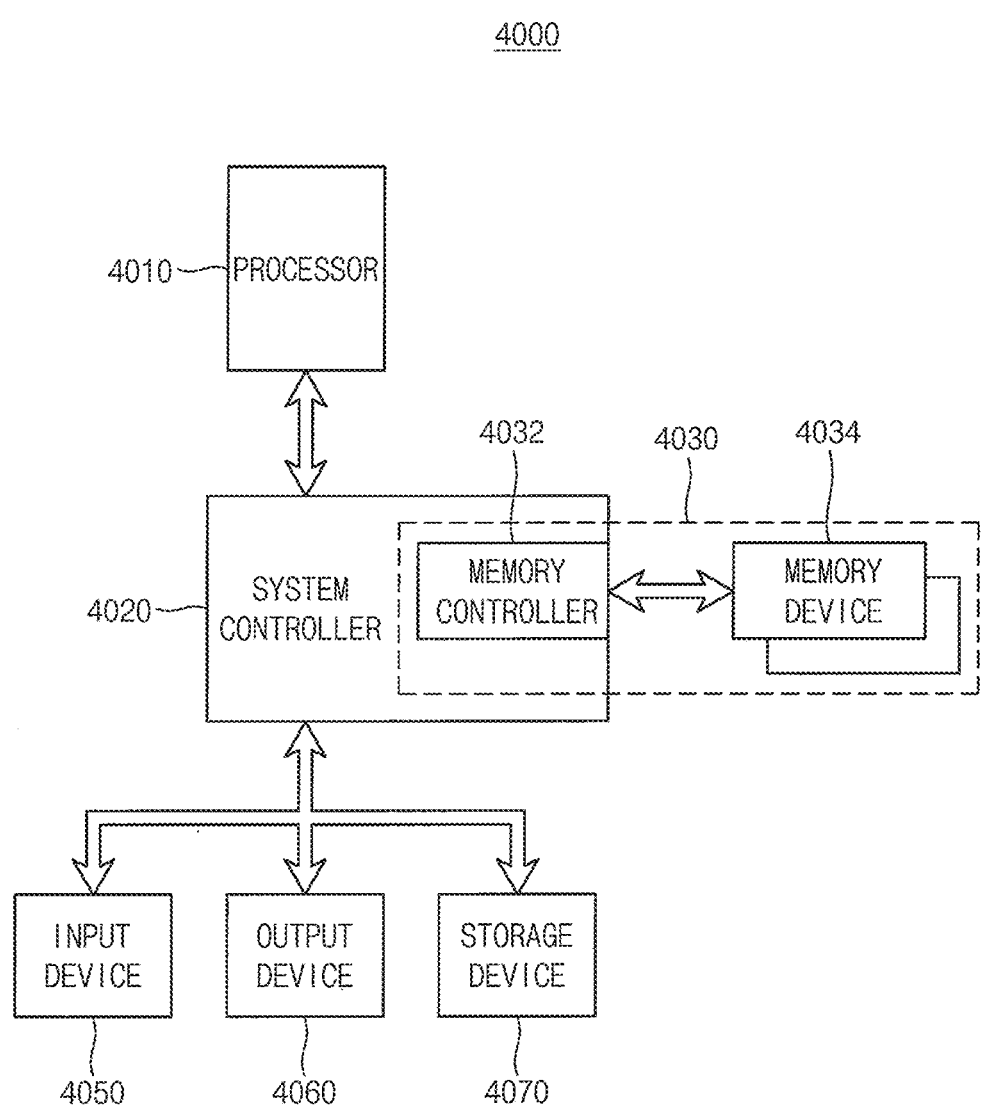
FIG. 15 is a block diagram illustrating a computing system according to at least some example embodiments of the inventive concepts.

FIG. 15 is a block diagram illustrating a computing system according to at least some example embodiments of the inventive concepts.

Referring to FIG. 15, a computing system 4000 includes a processor 4010, a system controller 4020 and a memory system 4030. The computing system 4000 may further include an input device 4050, an output device 4060 and a storage device 4070.

The memory system 4030 includes a plurality of memory devices 4034, and a memory controller 4032 for controlling the memory devices 4034. The memory controller 4032 may be included in the system controller 4020. The memory system 4030 may be the memory system according to at least some example embodiments of the inventive concepts, and may include the receiver according to at least some example embodiments of the inventive concepts.

The processor 4010 may perform various computing functions, such as executing specific software instructions for performing specific calculations or tasks. The processor 4010 may be connected to the system controller 4020 via a processor bus. The system controller 4020 may be connected to the input device 4050, the output device 4060 and the storage device 4070 via an expansion bus. As such, the processor 4010 may control the input device 4050, the output device 4060 and the storage device 4070 using the system controller 4020.

Figure 16:
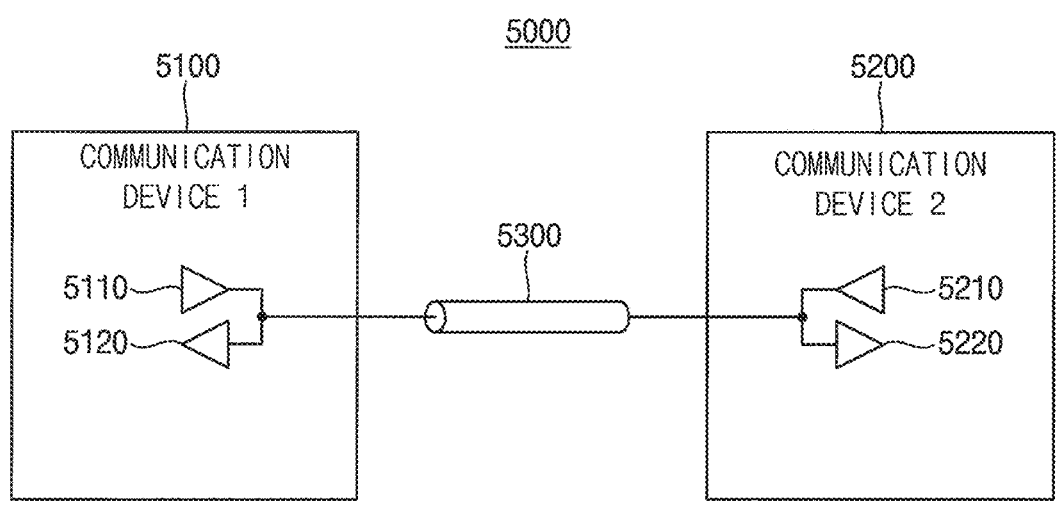
FIG. 16 is a block diagram illustrating a communication system according to at least some example embodiments of the inventive concepts.

FIG. 16 is a block diagram illustrating a communication system according to at least some example embodiments of the inventive concepts.

Referring to FIG. 16, a communication system 5000 includes a first communication device 5100, a second communication device 5200 and a channel 5300.

The first communication device 5100 includes a first transmitter 5110 and a first receiver 5120. The second communication device 5200 includes a second transmitter 5210 and a second receiver 5220. The first transmitter 5110 and the first receiver 5120 are connected to the second transmitter 5210 and the second receiver 5220 through the channel 5300. The receivers 5120 and 5220 may be the receiver according to at least some example embodiments of the inventive concepts. In some example embodiments, each of the first and second communication devices 5100 and 5200 may include a plurality of transmitters and a plurality of receivers, and the communication system 5000 may include a plurality of channels for connecting the plurality of transmitters and the plurality of receivers.

At least one example embodiment of the inventive concepts may be applied to various electronic devices and systems that include the memory devices and the memory systems. For example, at least one example embodiment of the inventive concepts may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A receiver included in a memory device, the receiver comprising:
   a flag generator circuit configured to generate a flag signal without an external command during a normal operation mode;
   an equalizer circuit configured, during the normal operation mode, to receive an input data signal through a channel, to generate an equalized signal by equalizing the input data signal based on an equalization coefficient, and to generate a data sample signal including a plurality of data bits based on the equalized signal; and
   an equalization controller circuit configured, during the normal operation mode, to determine an amount of change in the equalization coefficient based on the flag signal, the equalized signal and the data sample signal, and to perform a training operation in which the equalization coefficient is updated in real time based on the amount of change in the equalization coefficient.

2. The receiver of claim 1, wherein:
the input data signal corresponds to normal write data that is provided from a memory controller located outside the memory device during the normal operation mode, and
the training operation is a background self-training operation that is performed based on the normal write data during the normal operation mode, is internally performed without a control of the memory controller, and is hidden with respect to the memory controller.

3. The receiver of claim 1,
wherein the equalization controller circuit includes:
a reference voltage generator circuit configured to generate a reference voltage based on the flag signal; and
a processing circuit configured to check whether the equalization coefficient is set to a desired level based on the flag signal, the reference voltage, the equalized signal and the data sample signal, and to determine and output the amount of change in the equalization coefficient for setting the equalization coefficient to the desired level in response to the equalization coefficient not being set to the desired level, and
wherein the equalization controller is further configured to update the equalization coefficient in real time based on the amount of change in the equalization coefficient.

4. The receiver of claim 3, wherein the equalization controller circuit further includes:
a memory register configured to store the equalization coefficient.

5. The receiver of claim 3, wherein the equalization controller circuit is further configured to determine the equalization coefficient based on constant modulus algorithm (CMA).

6. The receiver of claim 1, wherein the flag generator circuit includes:
an environmental sensor configured to generate the flag signal by detecting a change in an operating environment.

7. The receiver of claim 6, wherein the environmental sensor is configured to activate the flag signal in response to at least one attribute of the operating environment changing to be out of a reference range.

8. The receiver of claim 6, wherein the environmental sensor includes at least one of a temperature sensor, a humidity sensor, a pressure sensor, a motion sensor, a temporal sensor, a spatial sensor, an illumination sensor, an acceleration sensor, a vibration sensor, a mechanical stress sensor or a shock sensor.

9. The receiver of claim 1, wherein the flag generator circuit includes:
a sensing circuit configured to generate the flag signal by detecting a change in a state signal associated with an operation of the memory device.

10. The receiver of claim 9, wherein the sensing circuit is configured to activate the flag signal in response to the state signal changing to out of a reference range.

11. The receiver of claim 9, wherein the state signal includes at least one of an error rate signal representing a data error rate of the memory device, a frequency signal representing an operating frequency of the memory device, and a voltage signal representing a level of an operating voltage of the memory device.

12. The receiver of claim 1, wherein the equalizer circuit includes a decision feedback equalizer (DFE) circuit.

13. The receiver of claim 1, wherein the equalizer circuit includes:
a feedback filter configured to generate a feedback signal based on the equalization coefficient and the data sample signal;
an adder configured to add the feedback signal to the input data signal; and
a sampling circuit configured to generate the data sample signal based on an output of the adder and a reference voltage.

14. The receiver of claim 13, wherein the feedback filter includes:
at least one delay circuit configured to delay the data sample signal; and
at least one multiplier configured to multiply an output of the delay circuit by the equalization coefficient.

15. The receiver of claim 1, wherein the equalization controller circuit is further configured to perform an initial training operation in which an initial value of the equalization coefficient is set based on the external command is performed during a training mode of the memory device.

16. The receiver of claim 15, wherein:
the equalization controller circuit is further configured such that, in response to the memory device being powered on, the equalization controller circuit performs the initial training operation during a training mode of the memory device, and
the equalization controller circuit is further configured such that, after the initial training operation is completed, the equalization controller performs a training operation during a normal operation mode of the memory device.

17. The receiver of claim 1, wherein flag generator circuit is further configured to generate a flag signal based on detecting a change in an operating state of the memory device.

18. A memory device comprising:
a receiver circuit configured to receive an input data signal; and
a memory cell array configured to perform a data write operation based on the input data signal, and
wherein the receiver circuit includes:
a flag generator circuit configured to generate a flag signal without an external command during a normal operation mode;
an equalizer circuit configured to, during the normal operation mode, receive the input data signal through a channel, to generate an equalized signal by equalizing the input data signal based on an equalization coefficient, and to generate a data sample signal including a plurality of data bits based on the equalized signal; and
an equalization controller circuit configured to, during the normal operation mode, determine an amount of change in the equalization coefficient based on the flag signal, the equalized signal and the data sample signal, and to perform a training operation in which the equalization coefficient is updated in real time based on the amount of change in the equalization coefficient.

19. The memory device of claim 18, further comprising:
a data input pad connected to the receiver circuit and configured to receive the input data signal.

20. The memory device of claim 18, wherein the memory device includes dynamic random access memory (DRAM).

21. The memory device of claim 18, wherein flag generator circuit is further configured to generate a flag signal based on detecting a change in an operating state of the memory device.

22. A receiver included in a memory device, the receiver comprising:
- a flag generator circuit configured to generate a flag signal by detecting a change in an operating environment or by detecting a change in a state signal associated with an operation of the memory device, without an external command during a normal operation mode of the memory device;
- an equalizer circuit configured, during the normal operation mode, to receive an input data signal through a channel, to generate an equalized signal by equalizing the input data signal based on an equalization coefficient, and to generate a data sample signal including a plurality of data bits based on the equalized signal;
- a reference voltage generator circuit configured to generate a reference voltage based on the flag signal during the normal operation mode;
- a processing circuit configured to, during the normal operation mode, check whether the equalization coefficient is set to a desired level based on the flag signal, the reference voltage, the equalized signal and the data sample signal, and determine and output an amount of change in the equalization coefficient for setting the equalization coefficient to the desired level in response to the equalization coefficient not being set to the desired level;
- an equalization coefficient controller circuit configured to update the equalization coefficient in real time based on the amount of change in the equalization coefficient during the normal operation mode; and
- a memory register configured to store the equalization coefficient,
- wherein the input data signal corresponds to normal write data that is provided from a memory controller located outside the memory device during the normal operation mode, and
- wherein the equalization coefficient controller circuit is further configured such that the updating of the equalization coefficient in real time includes a background self-training operation that is performed based on the normal write data during the normal operation mode, is internally performed without a control of the memory controller, and is hidden with respect to the memory controller.

* * * * *